(12) United States Patent
Derscheid et al.

(10) Patent No.: US 7,636,987 B2
(45) Date of Patent: Dec. 29, 2009

(54) WRAPPING MATERIAL WITH FASTENER

(75) Inventors: Daniel Eric Derscheid, Hendrick, IA (US); Hagai Paz, Kibbutz Mishmar Ha'Emek (IL); Yair Efrati, Kibbutz Mishmar Ha'Emek (IL); Henry Dennis Anstey, Ottumwa, IA (US)

(73) Assignee: Tama Plastic Industry (IL)

( * ) Notice: Subject to any disclaimer, the term of this patent is extended or adjusted under 35 U.S.C. 154(b) by 328 days.

(21) Appl. No.: 11/288,113

(22) Filed: Nov. 29, 2005

(65) Prior Publication Data

US 2006/0101624 A1     May 18, 2006

Related U.S. Application Data

(63) Continuation-in-part of application No. 10/517,172, filed as application No. PCT/IB2004/003475 on Oct. 22, 2004.

(51) Int. Cl.
  *A44B 18/00* (2006.01)
(52) U.S. Cl. .......................... 24/306; 24/442; 24/16 R; 428/100
(58) Field of Classification Search ........... 24/442–452, 24/16 R, 17 A, 17 AP, 306; 428/99, 100
See application file for complete search history.

(56) References Cited

U.S. PATENT DOCUMENTS

| | | | |
|---|---|---|---|
| 1,331,367 A | 2/1920 | Petermann | |
| 1,452,100 A | 4/1923 | Wheildon | |
| 1,557,881 A | 10/1925 | Rogers | |
| 2,539,725 A | 1/1951 | Caraher | |
| 3,056,245 A | 10/1962 | Baum et al. | |
| 3,120,727 A | 2/1964 | Ziliox | |
| 3,138,841 A | 6/1964 | Naimer | |
| 3,623,485 A | 11/1971 | Price | |
| 3,654,049 A | 4/1972 | Ausnit | |
| 3,733,769 A | 5/1973 | Van Doorn | |
| 3,797,650 A | 3/1974 | O'Brien, et al. | |
| 3,816,970 A | 6/1974 | Van Doorn, et al. | |
| 4,157,754 A | 6/1979 | Bartsch et al. | |
| 4,318,264 A | 3/1982 | Rewitzer | |
| 4,333,602 A | 6/1982 | Geschwender | |

(Continued)

FOREIGN PATENT DOCUMENTS

CA     739282     7/1966

(Continued)

*Primary Examiner*—Robert J Sandy
(74) *Attorney, Agent, or Firm*—Lerner, David, Littenberg, Krumholz & Mentlik, LLP

(57) ABSTRACT

A wrapping material for wrapping an item about its circumference having a plurality of wrapping portions forming a continuous roll. Each wrapping portion has a length that is greater than the circumference of an item to be wrapped with a width that is transverse to its length. Each of the wrapping portions include at least one fastener secured in an area there such that the continuous roll includes a plurality of serially disposed fasteners that are spaced from one another along the continuous roll. Each fastener includes a plurality of engaging elements for engaging a plurality of fiber elements of an underlying or overlying segment of a respective wrapping portion during a wrapping cycle. With this arrangement, the tail end of a respective wrapping portion will be secured by the plurality of engaging elements to the underlying or overlying segment at the end of a wrapping cycle.

17 Claims, 23 Drawing Sheets

U.S. PATENT DOCUMENTS

| | | | |
|---|---|---|---|
| 4,505,424 A | 3/1985 | Chappars | |
| 4,556,167 A | 12/1985 | Fox et al. | |
| 4,569,439 A | 2/1986 | Freye et al. | |
| 4,628,709 A | 12/1986 | Aeschbach et al. | |
| 4,672,722 A * | 6/1987 | Malamed | 24/446 |
| 4,679,851 A | 7/1987 | Solie et al. | |
| 4,703,605 A | 11/1987 | Ackermann | |
| 4,753,182 A | 6/1988 | Blackburn | |
| 4,775,310 A | 10/1988 | Fischer | |
| 4,901,855 A | 2/1990 | Furukawa | |
| 5,012,631 A | 5/1991 | Hostetler et al. | |
| 5,111,931 A | 5/1992 | Gombos et al. | |
| 5,152,125 A | 10/1992 | Laver | |
| 5,243,991 A * | 9/1993 | Marks | 600/499 |
| 5,369,852 A * | 12/1994 | Higashinaka | 24/446 |
| 5,457,855 A | 10/1995 | Kenney et al. | |
| 5,672,404 A * | 9/1997 | Callahan et al. | 428/100 |
| 5,732,531 A | 3/1998 | de Silva et al. | |
| 5,786,062 A * | 7/1998 | Callahan et al. | 24/442 |
| 6,205,623 B1 * | 3/2001 | Shepard et al. | 24/450 |
| 6,425,322 B1 | 7/2002 | Karlsson et al. | |
| 6,443,187 B1 | 9/2002 | Wang et al. | |
| 6,453,805 B1 | 9/2002 | Viaud et al. | |
| 6,481,063 B2 * | 11/2002 | Shepard et al. | 24/450 |
| 6,546,604 B2 * | 4/2003 | Galkiewicz et al. | 24/442 |
| 6,588,074 B2 * | 7/2003 | Galkiewicz et al. | 24/452 |
| 6,640,348 B1 * | 11/2003 | Clune et al. | 156/203 |
| 6,644,498 B1 | 11/2003 | Lemberger et al. | |
| 6,984,431 B2 | 1/2006 | Mass et al. | |
| 7,048,818 B2 * | 5/2006 | Krantz et al. | 156/66 |
| 7,168,139 B2 * | 1/2007 | Seth et al. | 24/452 |
| 2003/0045856 A1 * | 3/2003 | Couture et al. | 604/391 |
| 2004/0121108 A1 | 6/2004 | Mass et al. | |
| 2006/0101624 A1 | 5/2006 | Derscheid et al. | |

FOREIGN PATENT DOCUMENTS

| | | |
|---|---|---|
| DE | 3301420 A1 | 7/1984 |
| DE | 35 25 294 | 1/1987 |
| DE | 35 25 294 A1 | 1/1987 |
| DE | 198 33 554 | 1/1999 |
| EP | 0 233 471 | 8/1987 |
| EP | 0 324 577 | 7/1989 |
| EP | 0 233 471 | 6/1990 |
| EP | 0 608 871 | 8/1994 |
| EP | 1 321 028 | 6/2003 |
| EP | 1 369 516 | 12/2003 |
| EP | 1 474 965 A | 11/2004 |
| FR | 398606 | 6/1999 |
| GB | 2 221 841 | 2/1990 |
| GB | 2 221 841 A | 2/1990 |
| GB | 2348633 | 10/2000 |
| WO | WO 90/08708 | 8/1990 |

* cited by examiner

WRAPPING MATERIAL WITH FASTENER

This application is a continuation-in-part of co-pending national phase application 10/517,172 filed Oct. 22, 2004 as PCT/IB2004/003475, which designated the United States of America. The subject matter of each of the Ser. No. 10/517,172 and PCT/IB2004/003475 applications are hereby incorporated by reference in their entirety.

FIELD OF THE INVENTION

The present invention relates to a variety of wrapping materials, and in particular, wrapping materials incorporating a fastener, which secures the tail end of the wrapping material to the fibers of an underlying portion of the wrapping material at the conclusion of a wrapping cycle.

BACKGROUND OF THE INVENTION

The use of balers for baling agricultural crops into "round" bales (referring to a generally cylindrically shaped bale having a generally round cross-section) has become increasingly common in recent years, replacing the old system of baling square bales that were secured by different types of twine or metal wire. The first round-balers also used various types of twines to secure the bale, however, over the years different types of netting have been used. The use of netting, and in particular, knitted Raschel netting, has become more and more common. Raschel netting is a knitted netting that typically is made from polymeric material and includes a plurality of equally spaced longitudinal ribbons known as "franzes" and a plurality of intervening zigzag ribbons known as "schusses." However, the netting used, including Raschel knitted netting, is primarily open, with the franzes and schusses only making up a small percentage of the surface area of the bale and does not protect the bales from rain.

Plastic film wrap, including "sticky film" wrap has been used to wrap whole bales or portions of bales, with the goal of protecting a bale from rain.

However, the use of impermeable plastic film wrap does not allow moisture already within a baled crop to escape there from, since it is bound by an impermeable plastic layer. Since the inherent moisture level in baled crops may be on the order of one or more dozen percent of weight of the crop (for example, in baled hay), this bound-in humidity easily promotes spoilage of the baled crop.

Moreover, when such plastic film has been used in existing netting systems, typically only a portion of the bale was covered, leaving part of the circumference unwrapped and exposed to rain and/or to moisture from the ground on which the bale is resting. If the entire bale was wrapped with plastic film, then internal moisture could not escape. Likewise, any excess moisture gained by the crop from exposure to weather also promoted spoilage of the baled crop. Since bales are often left in a field, exposed to weather for a year or more, cumulative rain and/or ground moisture penetration may be significant, as may be the resultant crop spoilage.

Another disadvantage of using plastic film as a bale wrap has been that the film does not, itself, grasp onto a bale or underlying film layer, and thus a "sticky" portion had to be incorporated to prevent unraveling of the bale. However, use of such sticky film, even if only a small amount, was difficult to feed into a baler. Reasons for this include that, in the process of loading the film and wrapping a bale, the sticky film stuck to elements of the machine as well, making use of these materials difficult. In order to solve the problem of sticky film sticking to a baling apparatus itself, significant alterations to the baling apparatus had to have been made, often proving not to be cost-effective. The use of VELCRO, or VELCRO-type fasteners for wrapping and closing containers are known, as shown by U.S. Pat. No. 5,732,531 to de Silva et al., EP 0 608 871 A2 to de Silva, and Published UK Patent Application GB 2 221 841 A to Pentith.

Other known wrapping and closing containers, fasteners, and/or balers are also shown by the following (1) U.S. Pat. Nos.: 1,331,367; 1,557,881; 1,452,100; 2,539,725; 3,056,245; 3,120,727; 3,138,841; 3,623,485; 3,654,049; 3,733,769; 3,797,650; 3,816,6700; 4,157,754; 4,318,264; 4,333,602; 4,505,424; 4,556,167; 4,679,851; 4,628,709; 4,703,605; 4,753,182; 4,775,310; 4,901,855; 5,012,631; 5,111,931; 5,152,125; 5,457,855; 6,443,187; 5,732,531; 6,453,805; and 6,425,322., (2) U.S. Patent Application Publication: 2004/0121108, and (3) foreign patent documents: FR 398 606; DE 35 25 294 A1; EP 0 233 471 A1; EP 0 324 577 A1; GB 2 221 841; WO 90/08708; CA 739.282; EP 1 369 516 A1 DE 198 33 554 A1; GB 2 348 633 A; and EP 1 321 028 A1.

SUMMARY OF THE INVENTION

With the foregoing in mind, the wrapping materials of the present invention provide a solution to the problems noted above in the prior art.

In accordance with an aspect of the present invention, a fastener, i.e., at least one fastener is attached to a woven or non-woven wrapping material. Upon wrapping an item, each fastener cooperates with fiber elements of an underlying or overlying segment of the wrapping material to engage, lock, hold, or otherwise fasten the wrapping material tightly around the circumference of the item being wrapped with the tail end of the wrapping material being secured to the corresponding overlying or underlying segment of the wrapping material.

Each fastener preferably includes, for example, a plurality of small "J", mushroom, or finger shaped engaging elements, although other shapes may be used. Each of these engaging elements include an engaging element body having an engaging element base at one end and terminating at an engaging element free end for engaging, catching, grabbing, locking, holding, or otherwise fastening to the fiber elements of a corresponding underlying or overlying segment of the wrapping material. The engaging element body, from its base to its free end, extends, at angle relative to a fastener base, a length that is sufficient to allow the free end to engage, catch, grab, lock, hold, or otherwise fasten into fibers of the underlying or overlying segment of the wrapping material at the conclusion of a wrapping cycle.

Each fastener may be positioned anywhere along the length of the wrapping portion that allows each fastener to carry out its intended function. In some embodiments, for example, the fastener may be positioned near the tail end area of each wrapping portion of the wrapping material. In other embodiments the fastener may be positioned near the central region of each wrapping portion of the wrapping material. Still, other embodiments may include the fastener positioned near the leading end or other areas of each wrapping portion of the wrapping material.

Each fastener may also be positionally oriented on the wrapping material within an angular range of substantially parallel to the length direction of each wrapping portion to substantially transverse to the length direction of each wrapping portion. With these arrangements, a wide variety of continuous and/or discontinuous areas of connection between each fastener and their respective underlying or overlying segment of wrapping material may be realized that would allow fine tuning of the connection force and connection area to specific uses, items to be wrapped, and environmental conditions, just to name a few.

The wrapping material of the present invention may be fabricated, for example, from at least one continuous wrapping component, which may be in the form of either a continuous, single wrapping component or a continuous, composite wrapping component. The wrapping material of the present invention may also be fabricated from at least one of the aforementioned continuous wrapping components in combination with at least one discontinuous wrapping component, which is different from the continuous component. The wrapping material is preferably provided in roll form and comprises a plurality of end-to-end connected wrapping portions each having at least one fastener associated therewith. Each fastener may be formed, for example, as either a single fastener component or a plurality of co-acting, discontinuous fastener components. The at least one continuous wrapping component is preferably made from a woven or non-woven material and has a width substantially equal to the width of the item to be wrapped and a length sufficient for covering at least the circumference of the item to be wrapped. The at least one discontinuous wrapping component is preferably made from a breathable polymeric material having a width substantially equal to the width of the item being wrapped and a length for covering at least a part of the circumference of the item being wrapped. In embodiments where the wrapping material is fabricated from one of the aforementioned continuous wrapping components and without the discontinuous wrapping component, the continuous wrapping component may, preferably, be made from the same, or similar, breathable polymeric material as the at least one discontinuous wrapping component used in other embodiments.

The forgoing specific objects and advantages of the invention are illustrative of those that can be achieved by the present invention and are not intended to be exhaustive or limiting of the possible advantages that can be realized. Thus, these and other objects and advantages of this invention will be apartment from the description herein or can be learned from practicing the invention, both as embodied herein or as modified in view of any variation that may be apparent to those skilled in the art.

DETAILED DESCRIPTION OF THE INVENTION

Figure 1A:
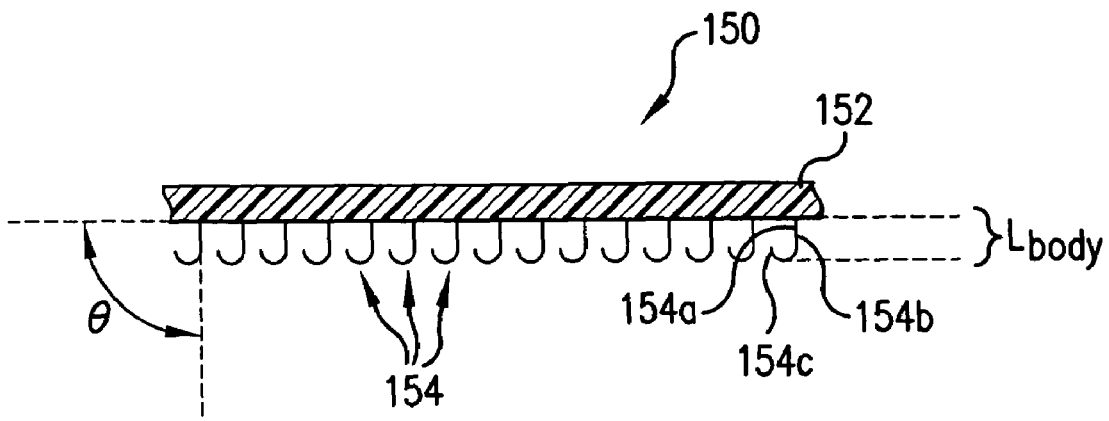
FIGS. 1A and 1B are cross-sectional views of hook-type fasteners according to the present invention.

The invention will now be described with reference to FIGS. 1-13, and the corresponding non-limiting examples. Like reference characters and designations throughout the figures refer to like elements.

As generally shown throughout FIGS. 2A-13D, the present invention includes a wrapping material 100 having at least one wrapping portion 110 incorporating at least one fastener 150 for securing both the wrapping portion 110 and the tail end 126 thereof in place around a wrapped item I. The wrapping material 100 may form a continuous roll of wrapping material 100 made from a plurality of wrapping portions 110, at least two being shown in FIGS. 2A, 2C, 3A, 3C, 10, and 12. Alternatively, the roll of wrapping material 100 may also be formed from a plurality of wrapping portions 110 connected end-to-end to one another, i.e., either end-to-end as a single continuous web or end-to-end as a plurality of sequential discontinuous segments secured to one another at respective ends.

Disposed on each of the wrapping portions 110 is at least one fastener 150 in the form of a strip, or a collection of strip segments, such that the continuous roll of wrapping material 100 has a plurality of fasteners 150 serially disposed in an area of each of the plurality of wrapping portions and spaced from one another. Each wrapping portion 110 includes a fastener 150 within that area. As shown in FIGS. 2A-9 and 13A, for example, each fastener 150 may be disposed in the vicinity 125 of the tail end 126 of each wrapping portion 100. Alternatively, as shown in FIGS. 10 and 11A-D, each fastener 150 may also be disposed in an interior region of each wrapping portion 110 that is remote from both the leading end 124 and the tail end 126. With either arrangement, each fastener 150, upon wrapping an item I, will engage, catch, grab, lock, hold, or otherwise fasten into the fiber elements of the underlying or overlying portion 112 of the wrapping portion 110, thereby securing the wrapping portion around the item I as well as the tail end 126 to the underlying or overlying portion 112.

Figure 1B:
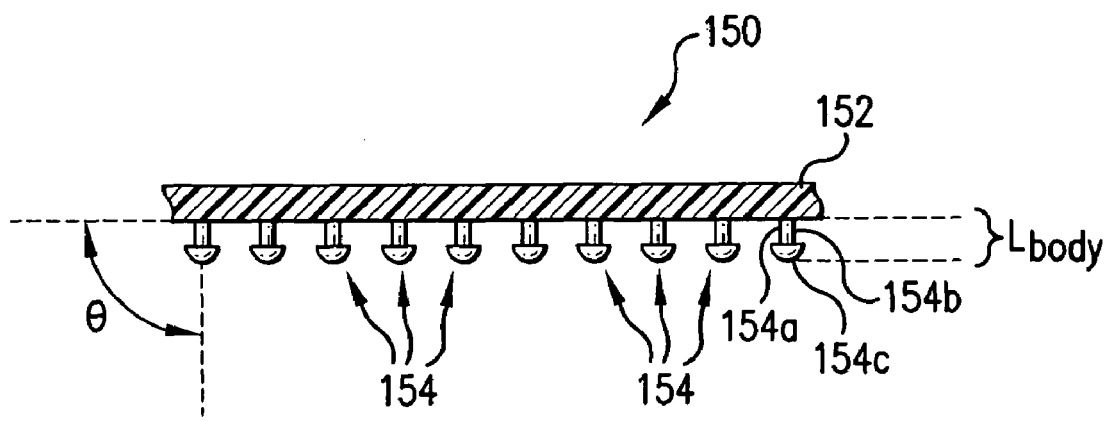
Figure 1C:
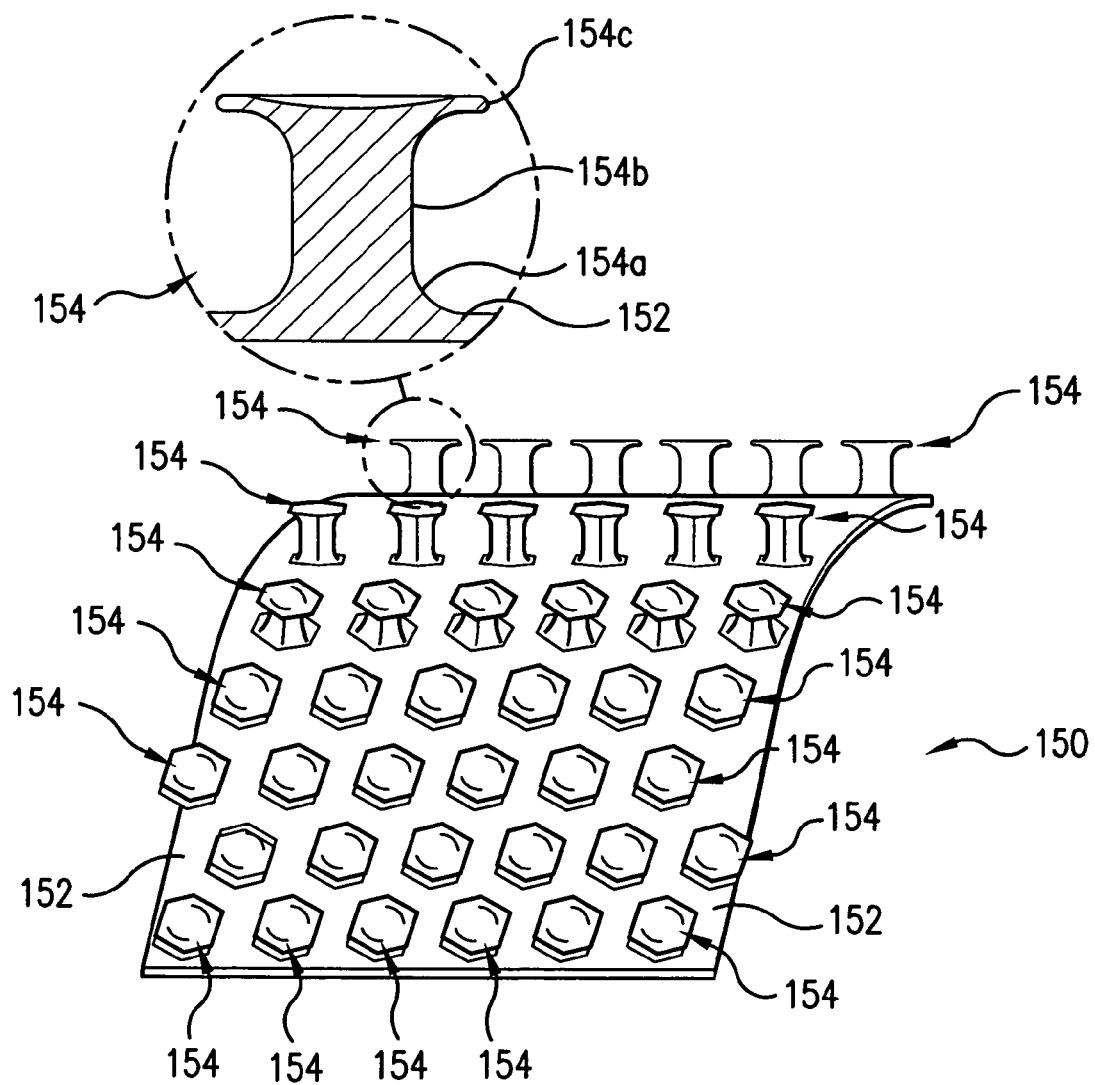
FIGS. 1C and 1D are perspective views of the hook-type fastener according to the present invention.
Figure 1D:
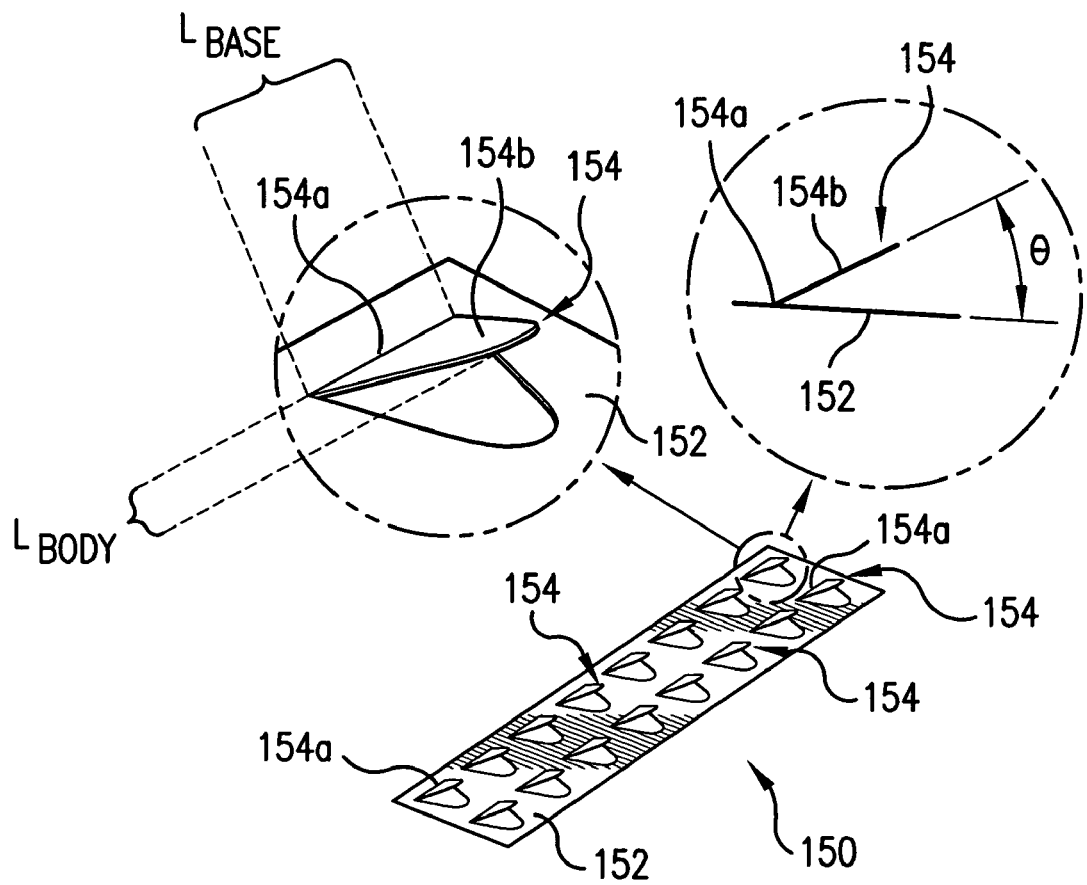

As shown in FIGS. 1A-1D, each fastener 150 include a fastener base 152 and a plurality of small "J" shaped, or mushroom shaped, or finger shaped engaging elements 154. Each of the plurality of engaging elements 154 are secured to the fastener base 152 at a respective engaging element base 154a. Each engaging element 154 extends away from the fastener base 152, at a general angle θ in a range of about 15 degrees to about 90 degrees, relative to the fastener base 152, along at least a portion of an engaging element body 154b at a length $L_{body}$. The length $L_{body}$ of the engaging element 154b, for the embodiments shown in FIGS. 1A-1C, is within a general range of about 0.1 mm to about 10 mm, preferably, in a range of about 0.1 mm to about 1 mm, and more preferably, in a range of about 0.1 mm to about 0.5 mm, and terminating in the free end 154c. The length $L_{body}$ of the engaging element body 154b, for the embodiment shown in FIG. 1D, is within a general range of about 3 mm to about 20 mm, and more preferably, in a range of about 8 mm to about 12 mm. For the FIG. 1D embodiment, the length $L_{base}$ of the engaging element base 154a is also in a range of about 3 mm to about 20 mm, and more preferably, in a range of about 8 mm to about 12 mm. With the embodiment shown in FIGS. 1A-1C, the engaging elements 154 extend from the fastener base 152 generally at an angle of about 90 degrees relative to the fastener base, although the angle θ can vary. With the embodiment shown in FIG. 1D, each of the engaging elements 154, preferably, extends away from the fastener base 152 at an angle θ in a range of about 15 degrees to about 45 degrees. The length of the engaging element base 154a for the embodiments of FIGS. 1A-1C, however, is substantially the thickness, or diameter, of the engaging element body near the fastener base 152. FIG. 1A shows the engaging elements 154 as a "J" shape. FIGS. 1B and 1C shows the engaging elements 154 as having a mushroom shape. It should be understood that the engaging elements 154 may be of any shape that allows them to sufficiently carry out their intended function of grasping the fiber elements of an underlying or overlying portion 112 of the wrapping material 100 to secure both the wrapping portion 110 around a wrapped item I and the tail end 126 to the underlying or overlying portion 112. Each fastener 150 may be disposed either near the tail end 126 or within an interior region of each wrapping portion 110 of the wrapping material 100 and positioned in any angular orientation relative to either the length direction, shown as arrow A in FIGS. 2A-12, of the wrapping material 100 or the width direction, shown as arrow B in FIGS. 2A-12, of the wrapping material 100. Upon completion of a wrapping cycle, a wrapping portion 110, which is wrapped around the item I in a self-overlapping manner, as shown in FIGS. 13A-D, is secured to itself via the engaging, grabbing, locking, or fastening, interaction of the small engaging elements 154 with the fiber elements of a respective underlying or overlying segment 112 of the wrapping portion 110. The engaging action of the plurality of engaging elements 154 fasten, lock, grab, or otherwise secure the tail end 126 of each wrapping portion 110 securely in place as well as securing the wrapping portion 110, itself, tightly around the circumference of the wrapped item I.

In the embodiments shown in FIGS. 2A-11D and 13A-13C, the wrapping material 100 is formed as composite wrapping material 100 that includes a continuous netting component 120, a discontinuous, breathable material component 130, and at least one fastener 150. The netting 120 of the wrapping material 100 is preferably woven and may, preferably, take the form of a single continuous web of netting. Ideally, a suitable netting material may be any woven, preferably unraveling resistant, material with sufficient longitudinal (length direction A) and lateral (width direction B) strength to hold the wrapping material 100 in place around an item to be wrapped, and that allows attachment, via an adhesive or other suitable connection means, of the breathable material panels 130 and the fasteners 150 with minimal difficulty.

Figure 2A:
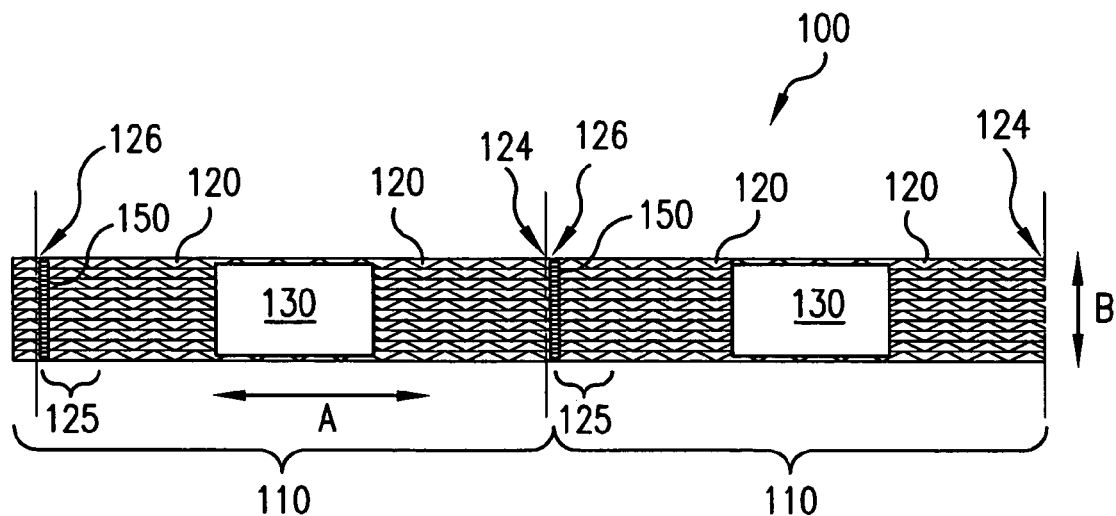
FIGS. 2A-12 are various top views of the wrapping material in accordance to the present invention.
Figure 2B:
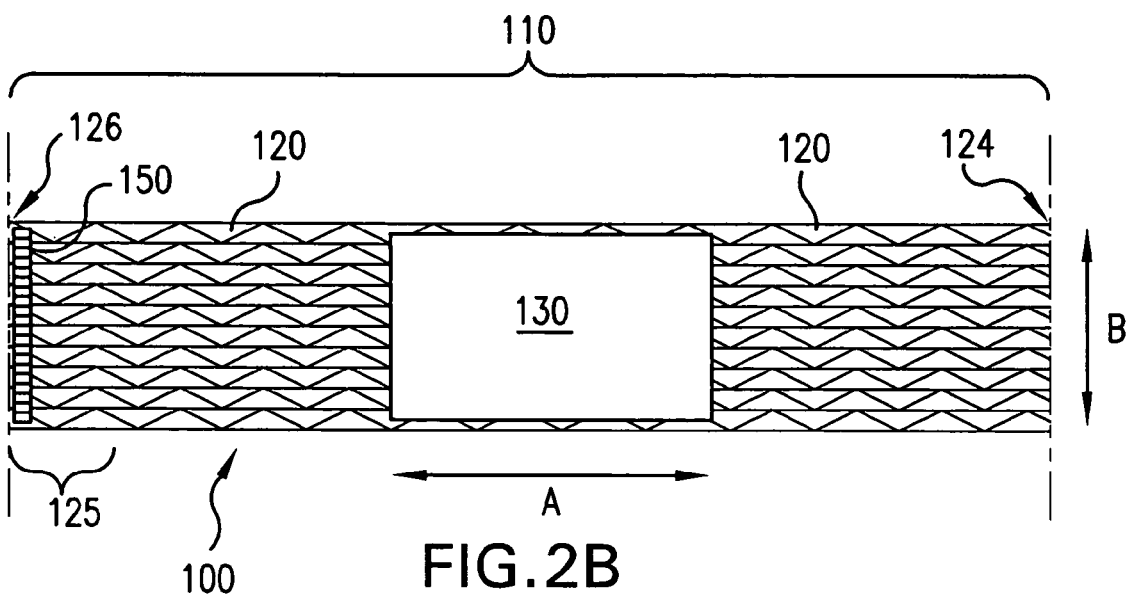
Figure 2C:
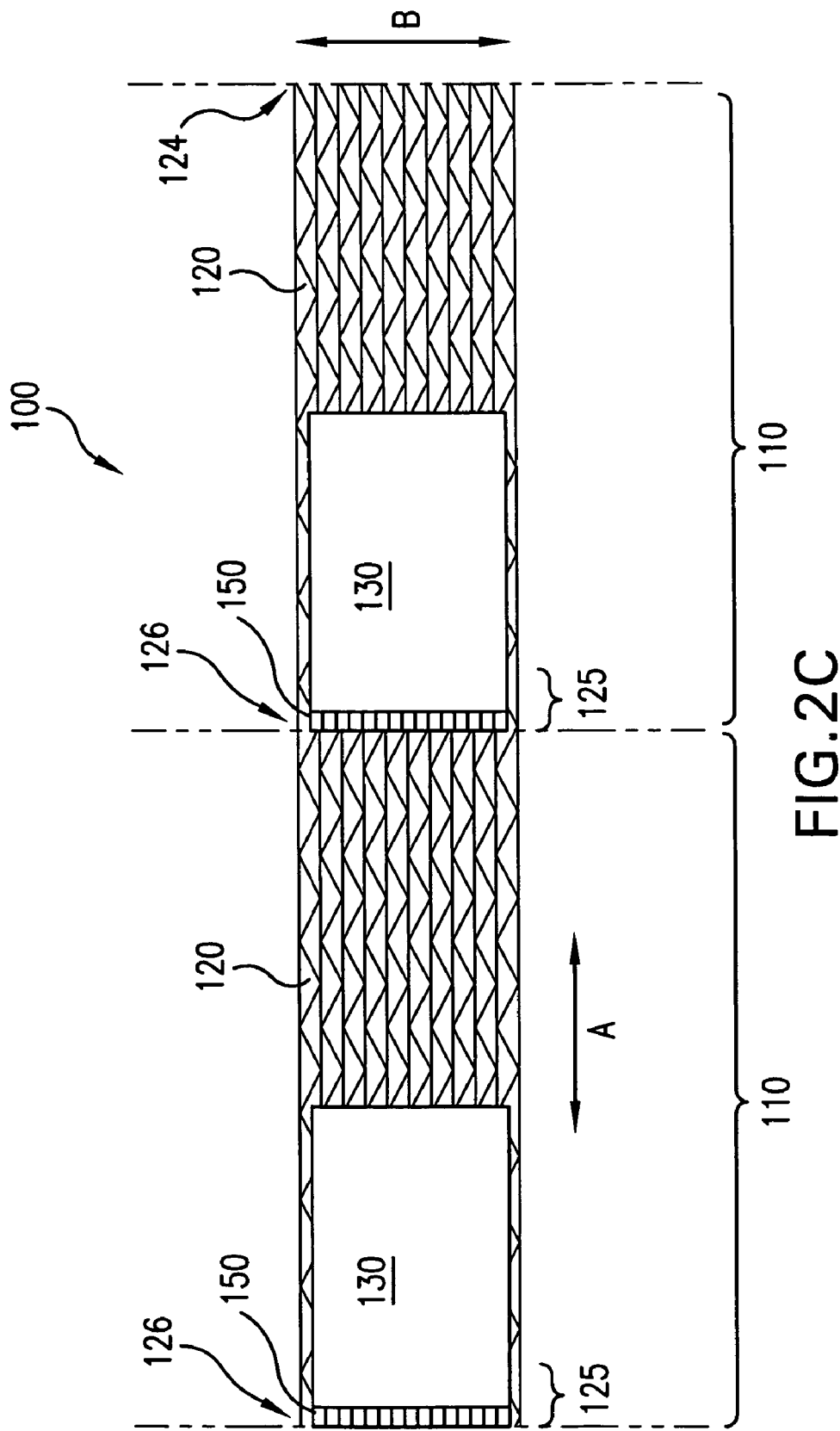
Figure 3A:
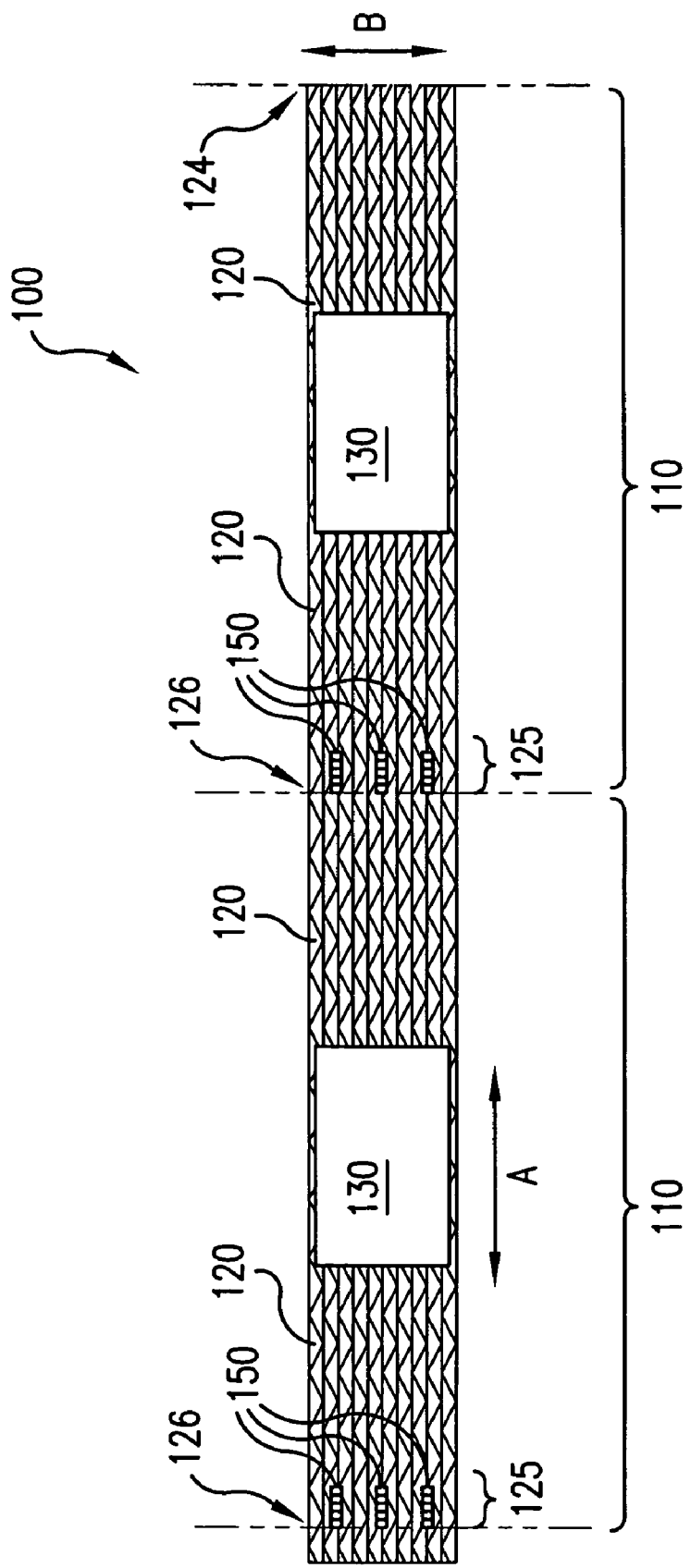
Figure 3B:
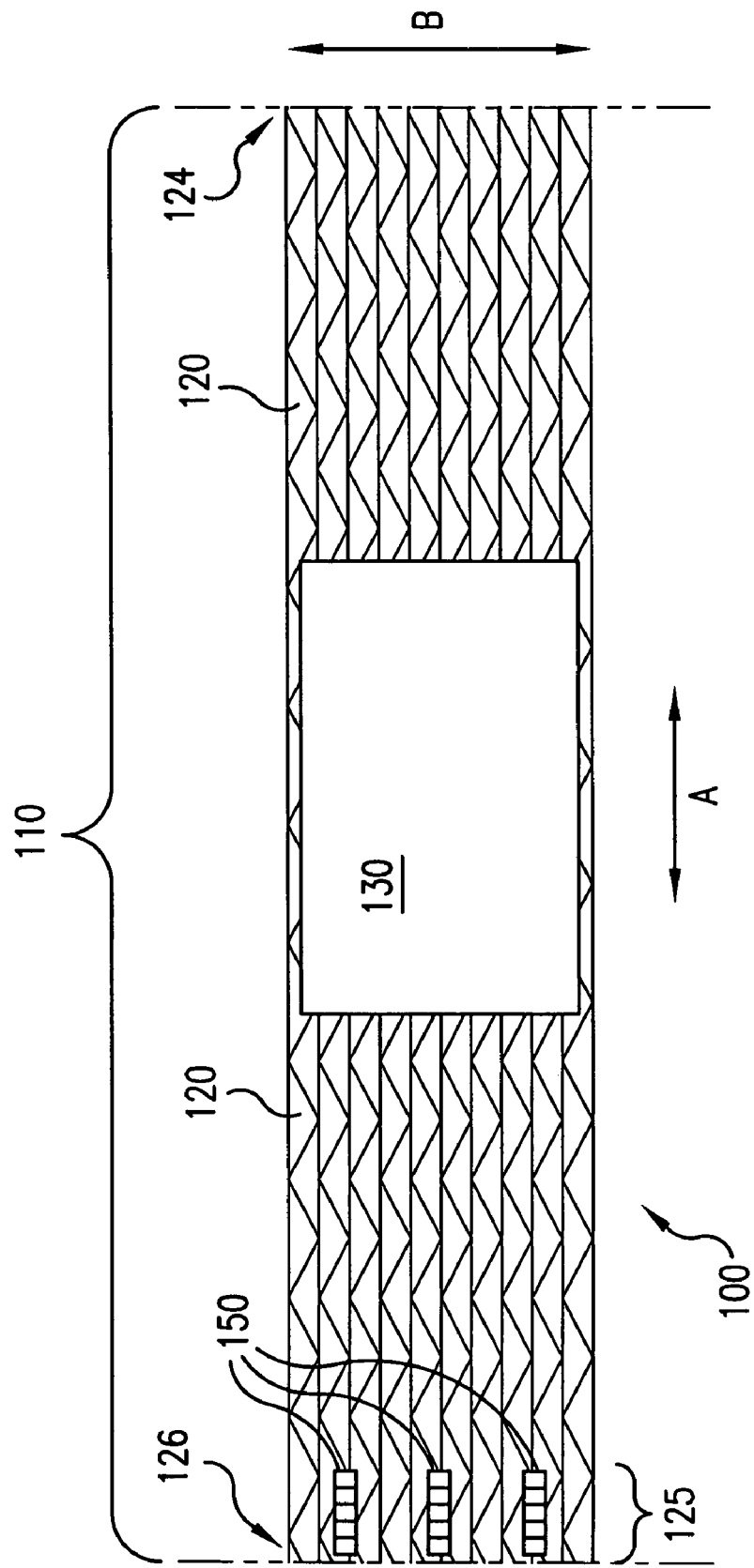
Figure 3C:
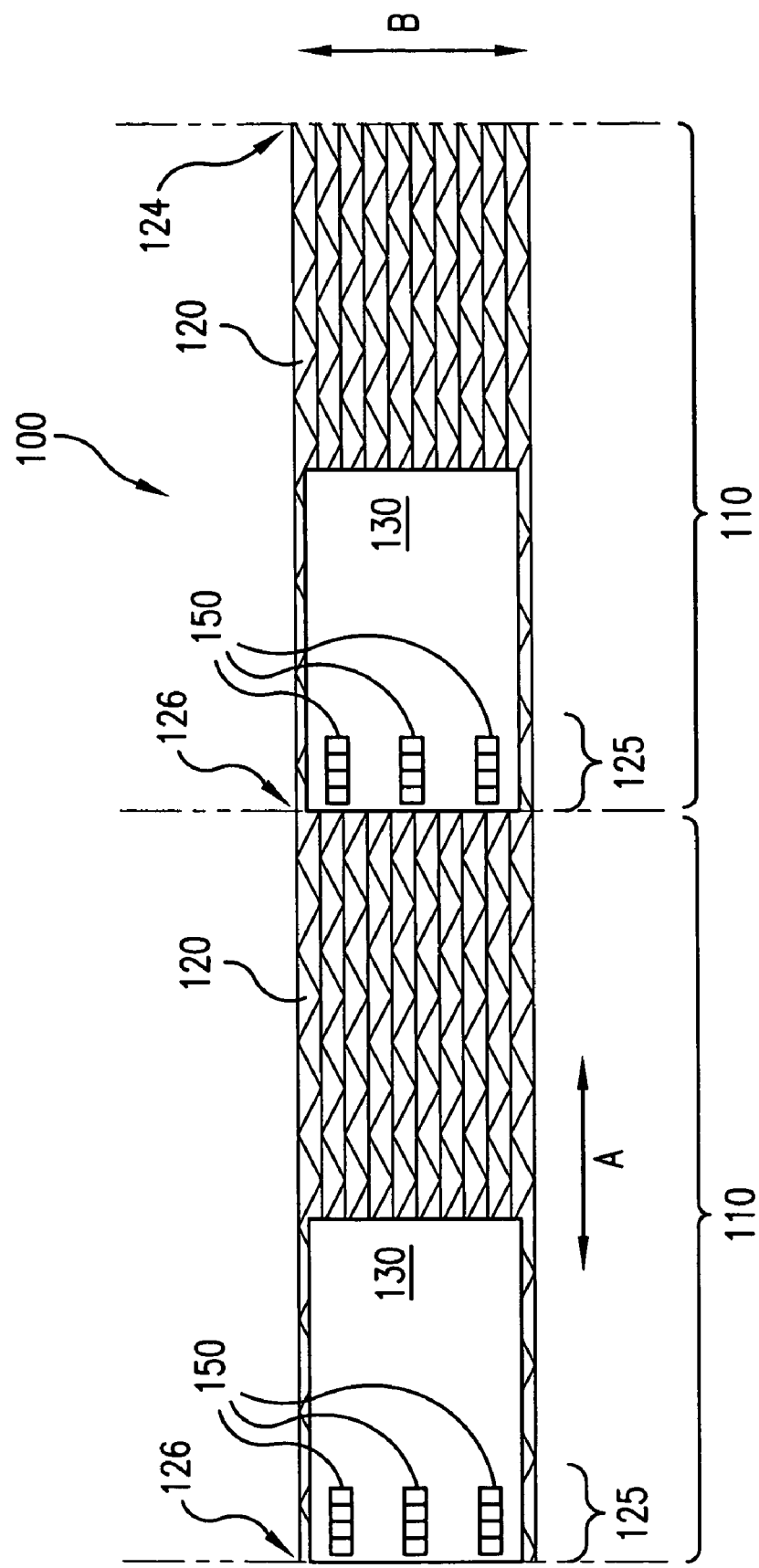
Figure 4:
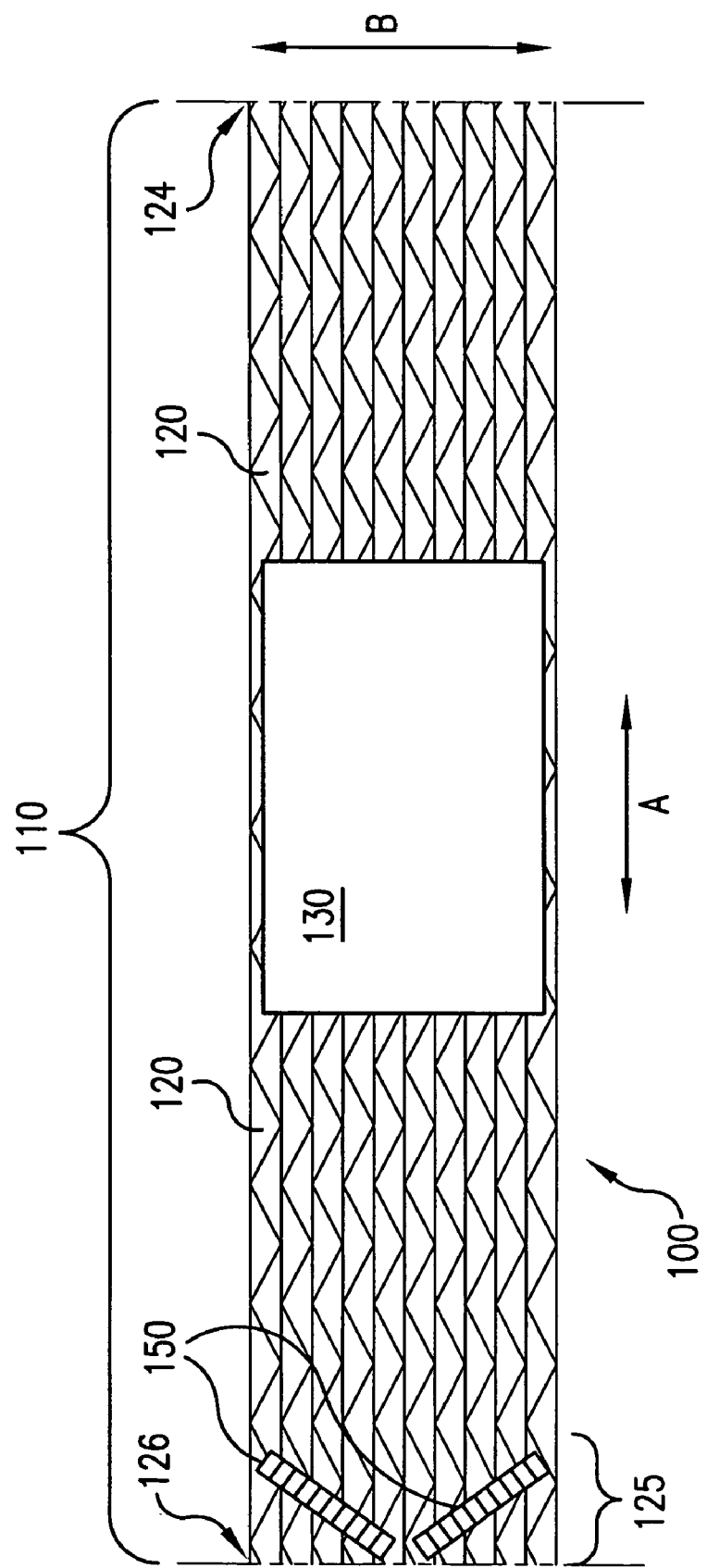
Figure 5:
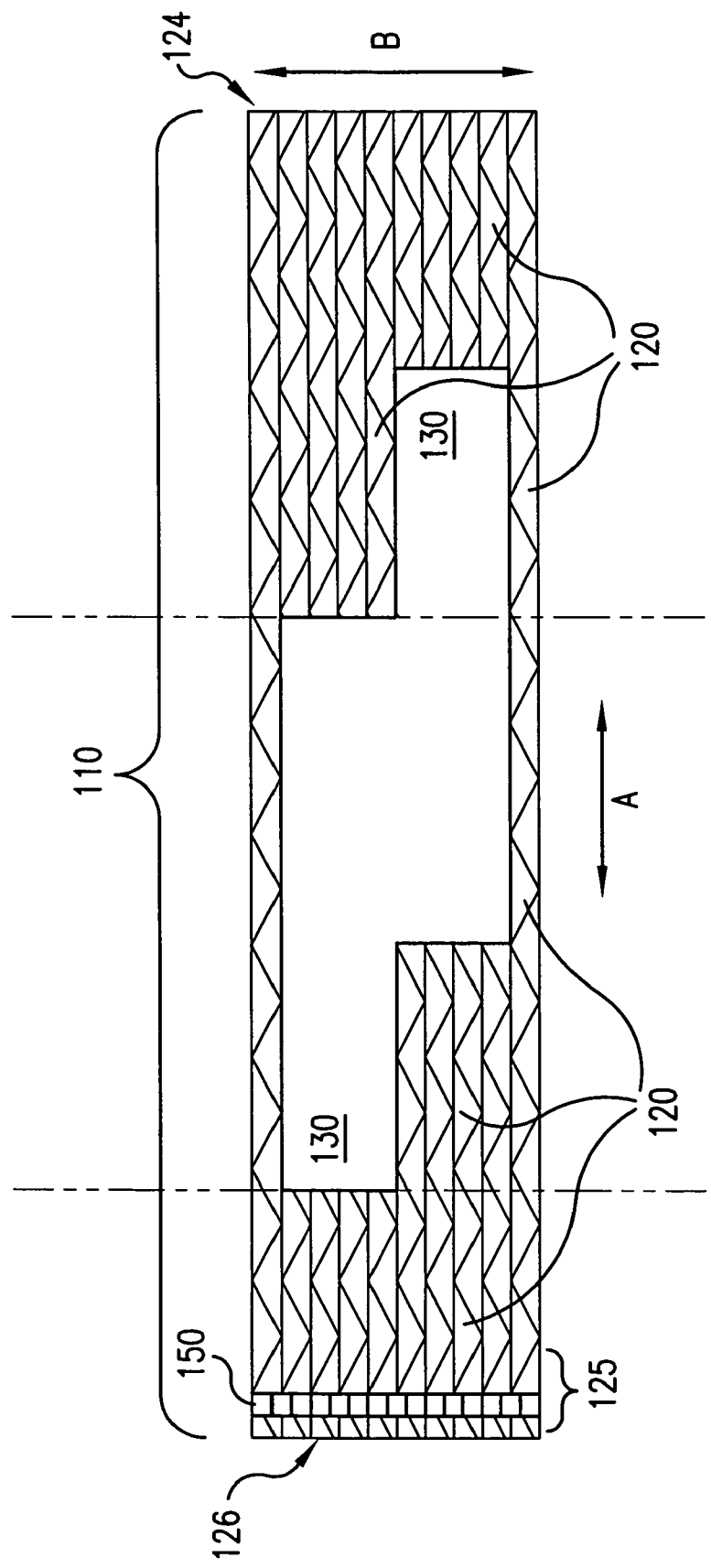
Figure 6:
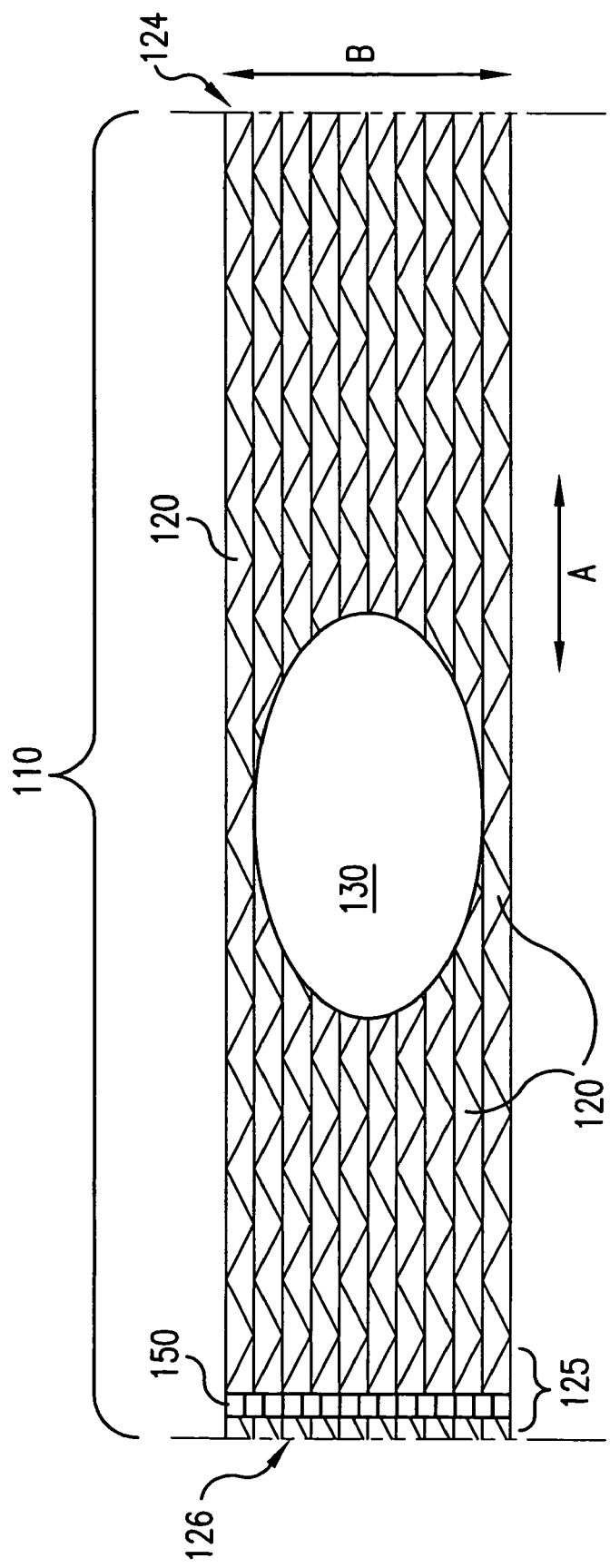
Figure 7:
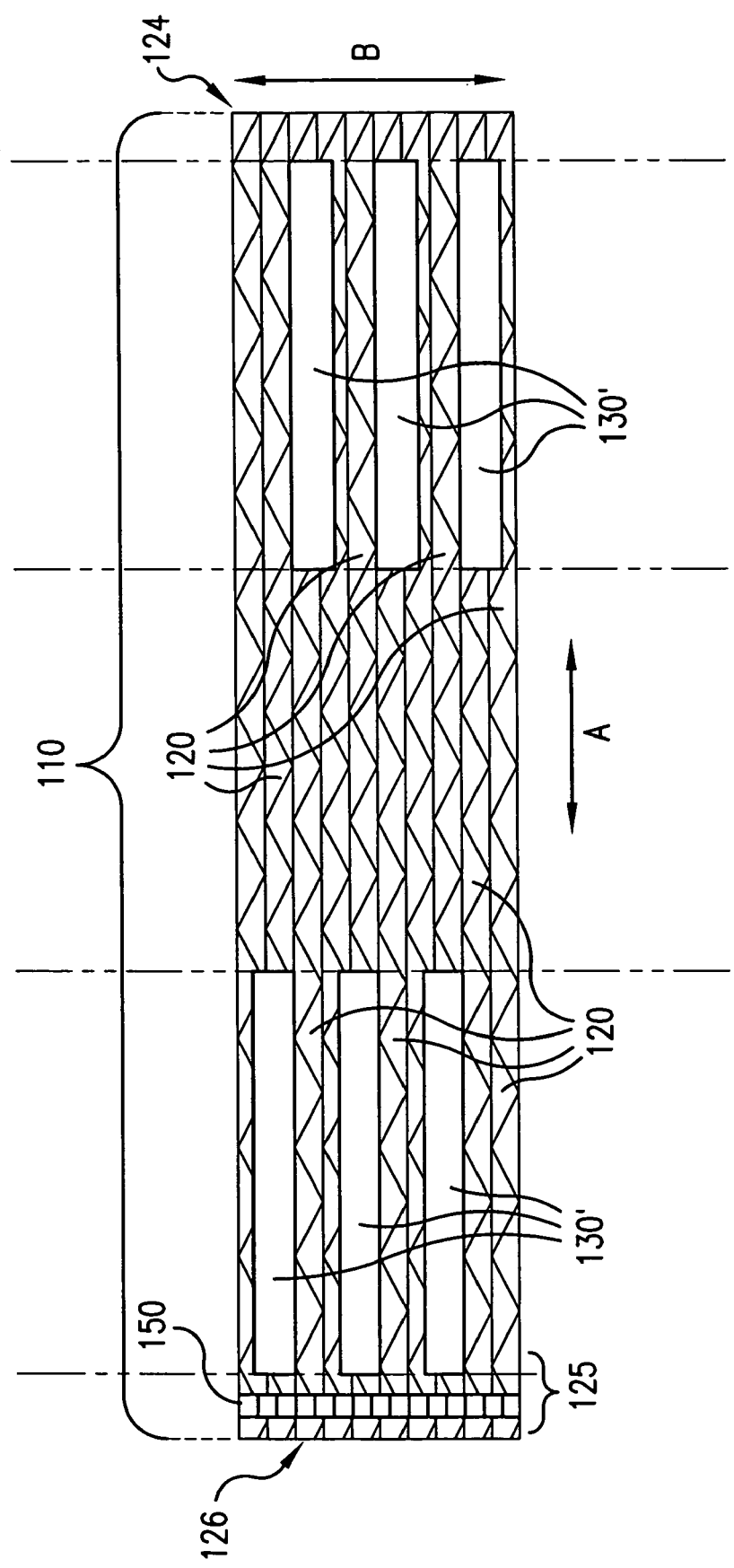
Figure 8:
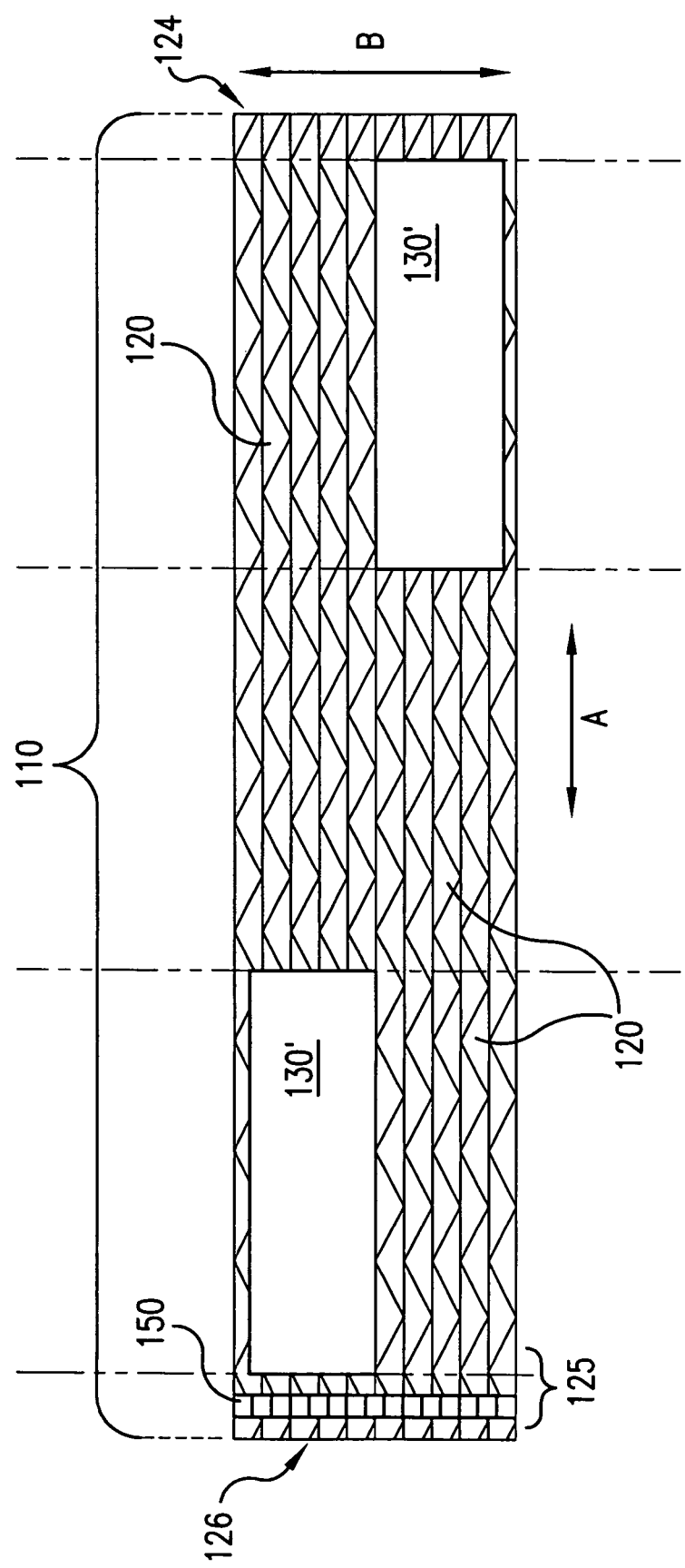
Figure 9:
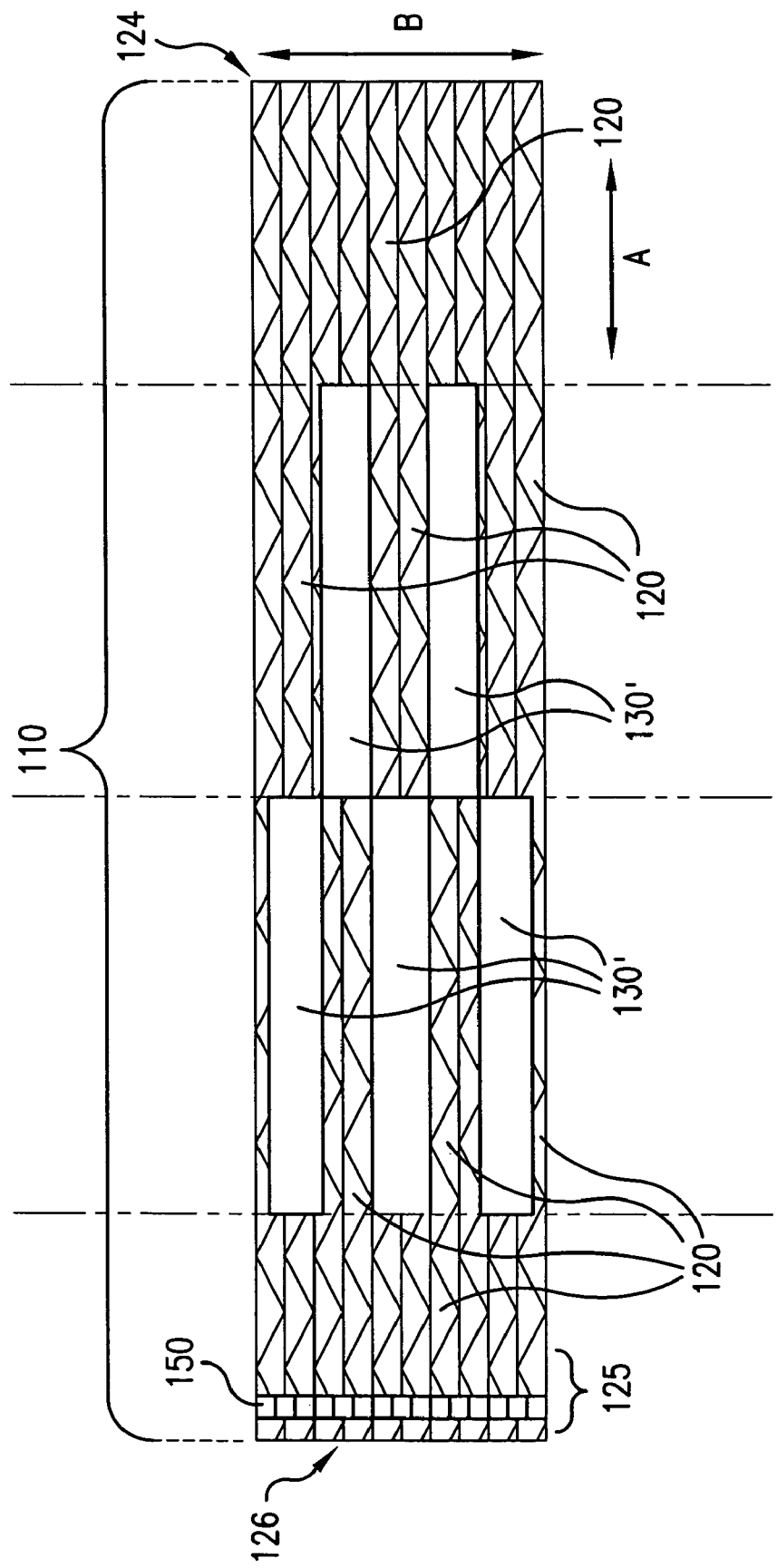
Figure 10:
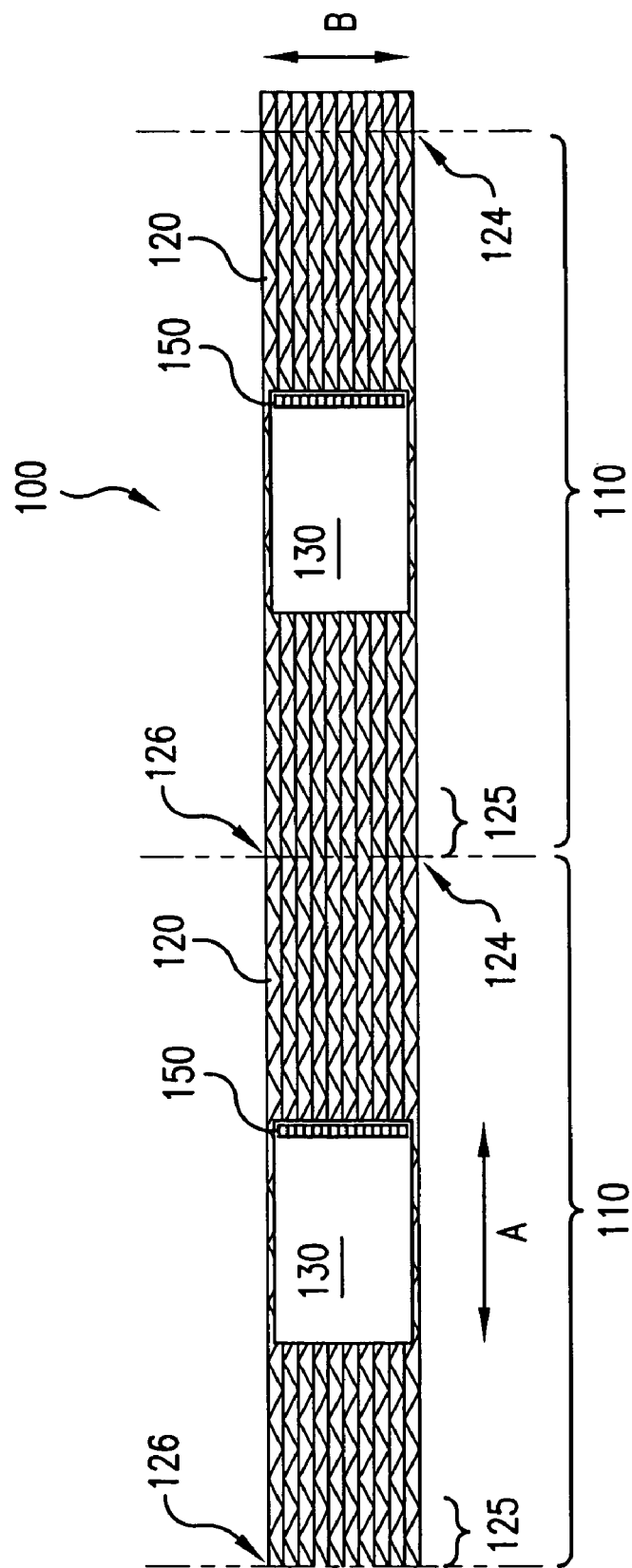
Figure 11A:
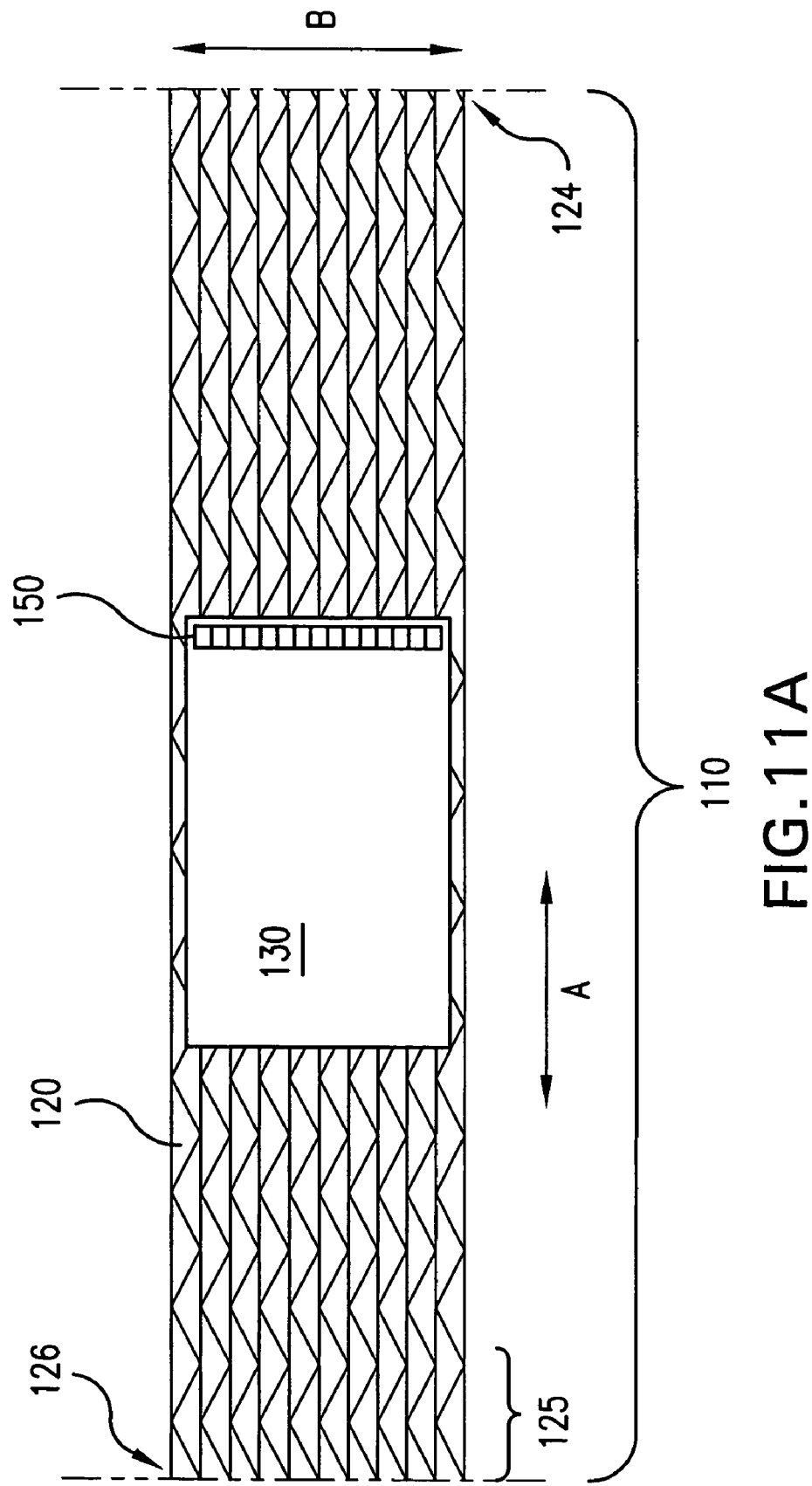
Figure 11B:
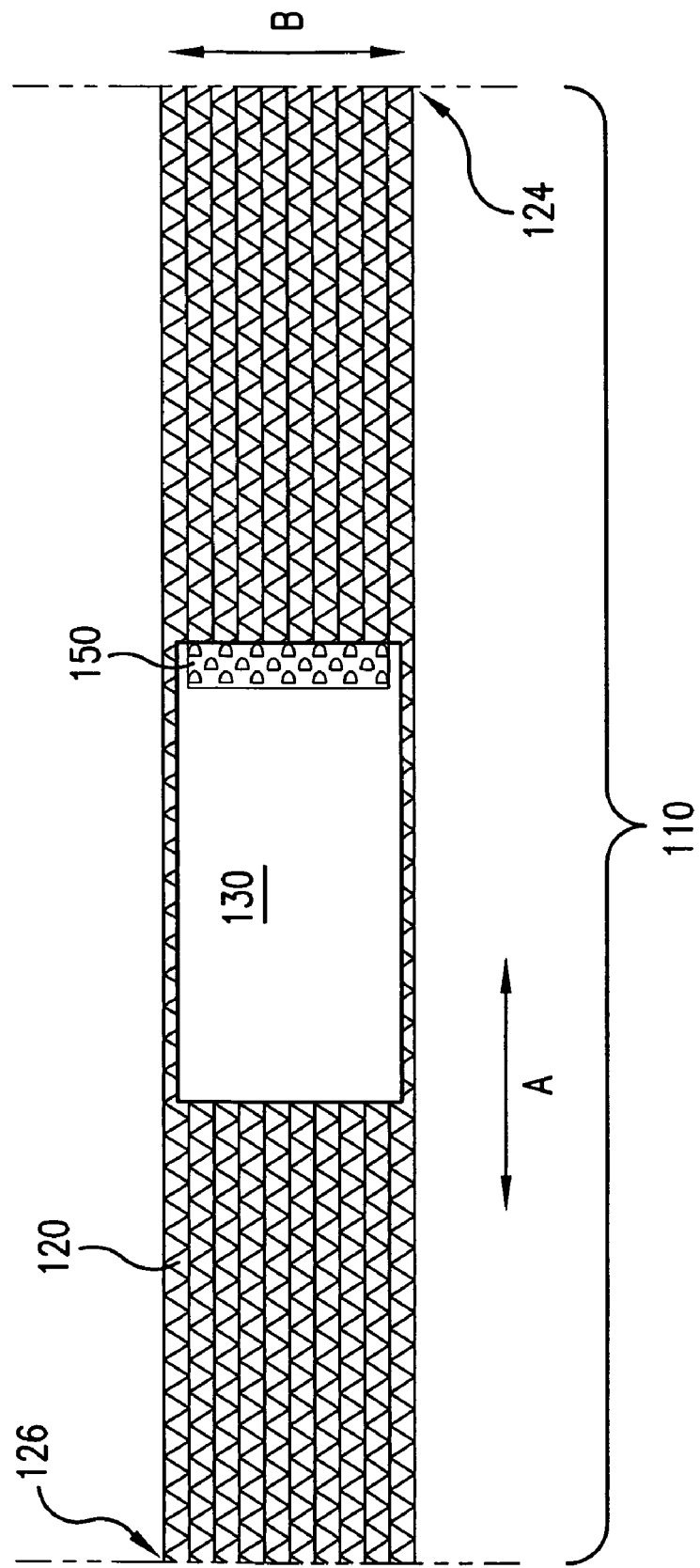
Figure 11C:
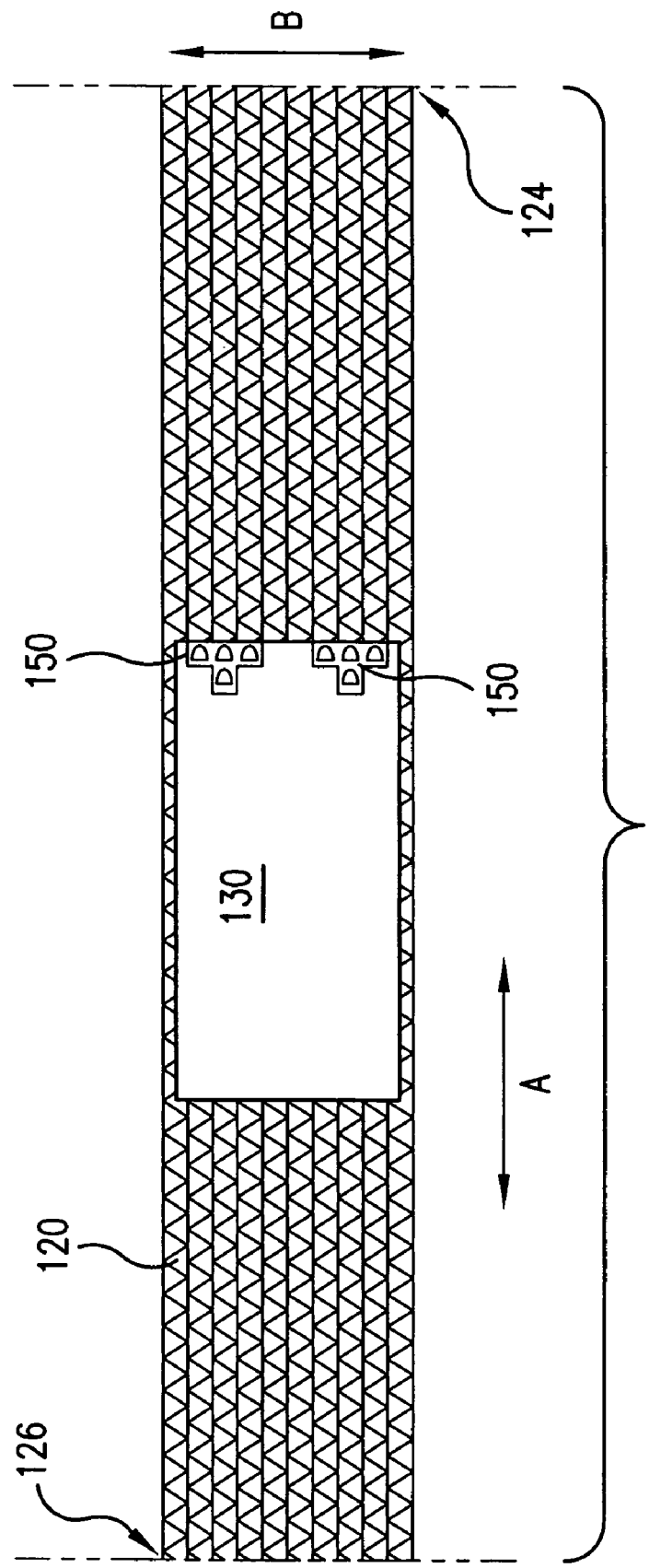
Figure 11D:
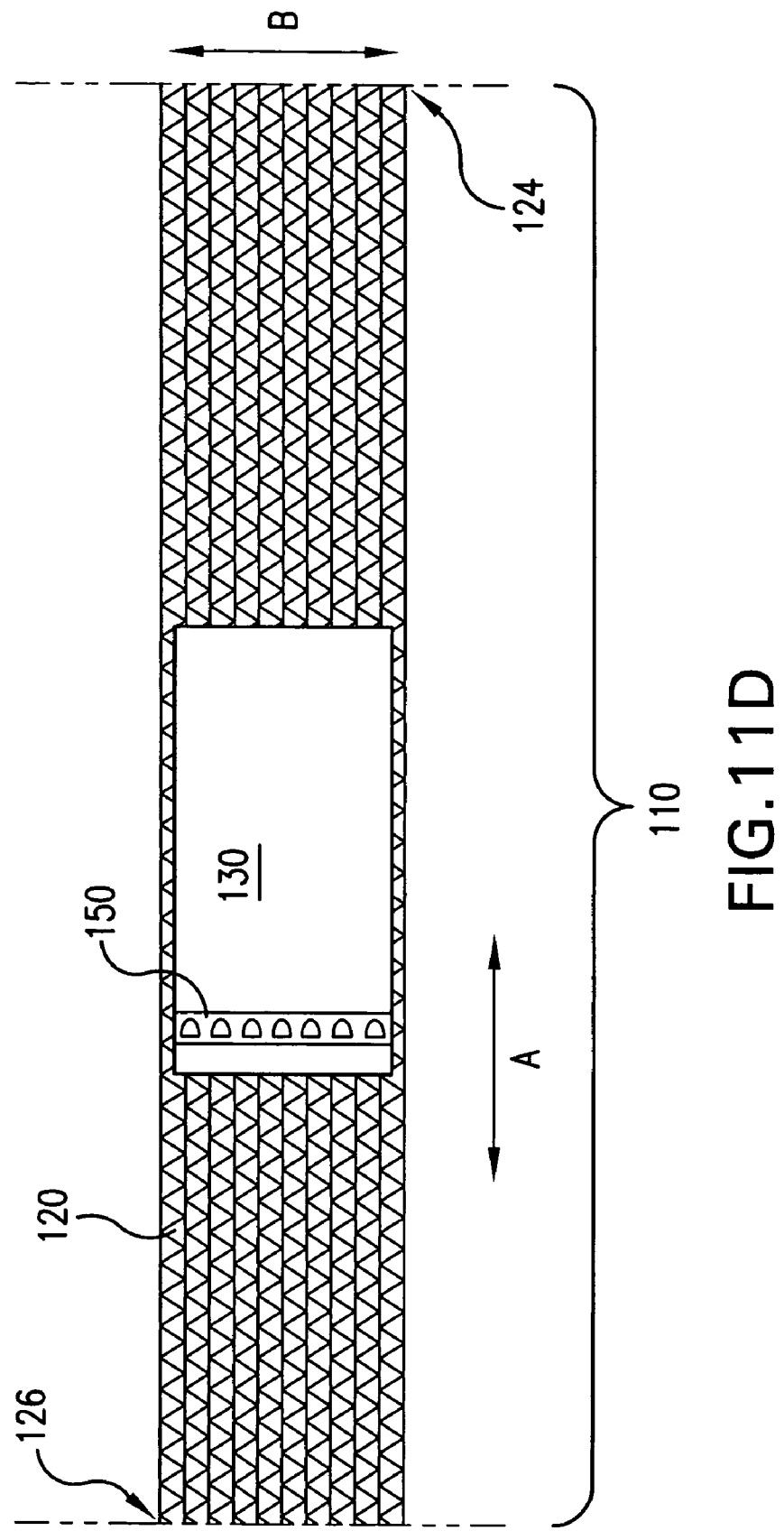

The breathable material 130 may include a non-woven material or film, such as, for example, fused polyethylene material (e.g., Tyvek®), SMS (styrene/alpha-methylstyrene), spun bound materials, melt blown material, micro perforated film, multi-layer breathable sheets, or the like. Each of the breathable material component 130 allow water vapor to escape from the wrapped item, and prevents condensation or moisture from getting to the wrapped item I from the outside. The breathable material components 130 may be formed into a plurality of discontinuous panels, though at least two such panels 130 are illustrated in FIGS. 2A, 2C, 3A, 3C, and 10, it should be understood that any number of such panels 130 are adhered to the continuous web of netting 120 in a substantially repeating pattern throughout its length. The breathable material panels 130 are spaced along the continuous netting material 120 at pre-selected intervals, which relate to a circumference of an item I to be wrapped. The overall width of the breathable materials 130 is substantially equal to a width of the item I to be wrapped. The breathable panels 130 may be secured to the netting component 120, via any suitable adhesive, at any desired location. FIGS. 2A-4 show the breathable panels 130 positioned approximately in the central area of each wrapping portion 110, although the breathable panels 130 may be positioned any where along the length of the wrapping portion 110. FIGS. 2C and 3C show the breathable panels 130 in an alternative arrangement, in which the breathable panels 130 are positioned near the tail end 126 of each wrapping portion 110 of the wrapping material 100.

As shown in FIGS. 2A-6, 10, and 11A-D, each breathable panel 130 may comprise a single sheet of breathable material having various geometrical shapes. The shape of the breathable panel 130, as shown in FIGS. 2A-4, 10, and 1A-D may be generally rectangular, whereas the breathable panel 130 may also be made in various other shapes, such as, for example, the shapes shown in FIGS. 5 and 6. Further, the breathable panel 130 may also be made from a collection, or plurality, of smaller breathable sub-panels 130', such as, for example, the sub-panels 130' shown in FIGS. 7-9. When wrapped around an item I, the sub-panels 130' of the wrapping portion 110, collectively co-act with one another to form a breathable panel 130 having a width and length as previously discussed. It should be noted that any of the single panels 130 can be substituted with a plurality of sub-panels 130' that, which wrapped around an item I co-act together to form a single panel. In arrangements utilizing sub-panels 130', each fastener 150 used therewith may take the form of the previously described single continuous fastener strip or plurality of discontinuous fastener strip segments, which may also be disposed on either, or both, of the continuous component 120 and/or the discontinuous components 130 and/or 130' of the composite wrapping material 100.

Figure 12:
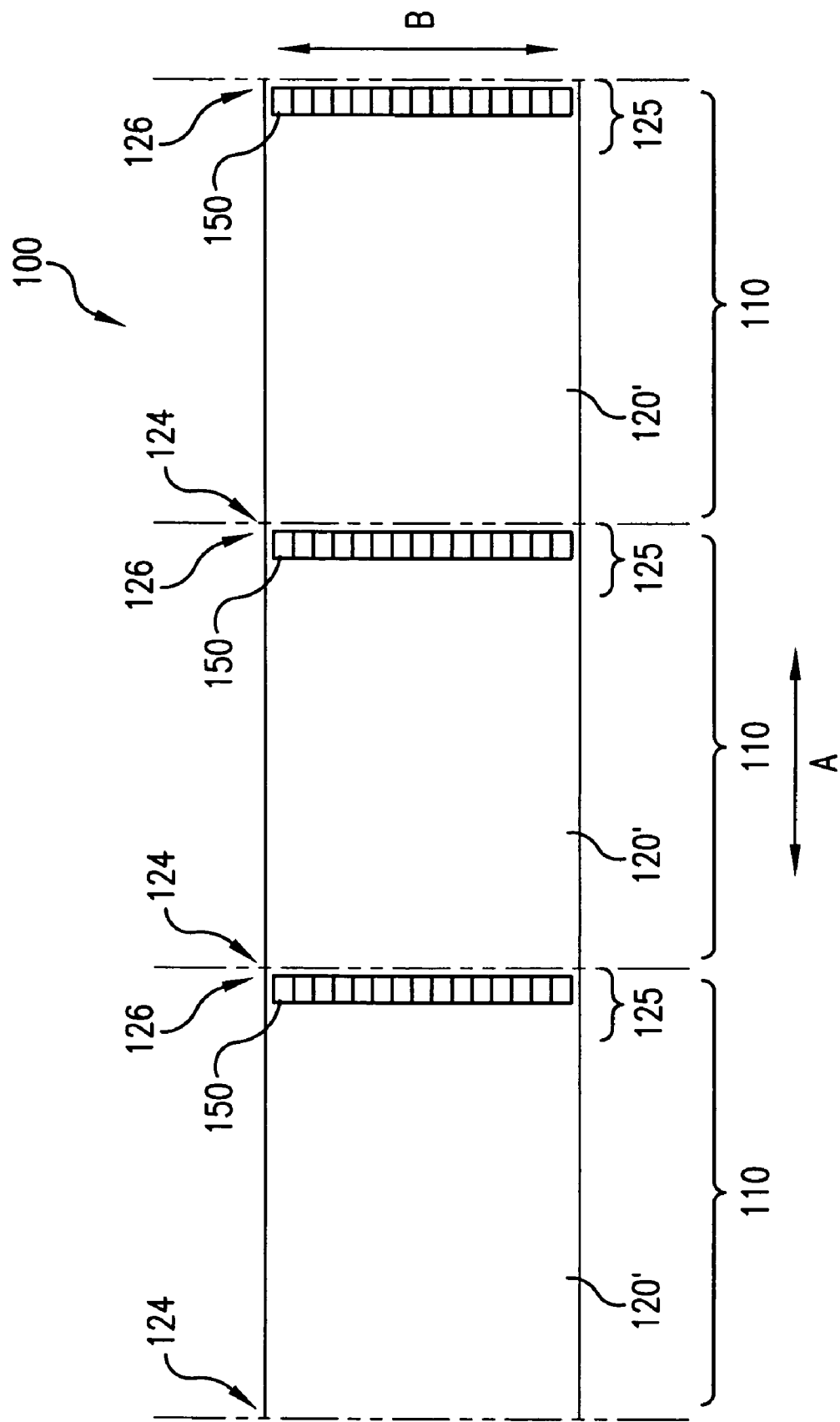

As shown in FIG. 12, the wrapping material 100 is fabricated from a continuous, single or composite wrapping component 120', which does not include the use of the discontinuous wrapping components 130, 130', as utilized in the embodiments of FIGS. 2A-11D. In this embodiment, the continuous wrapping component 120' is formed from either a continuous, single sheet or a plurality of discontinuous sheets secured together end-to-end to form a continuous composite wrapping components 120'. Regardless of whether the continuous wrapping components 120' is utilized as a continuous, single wrapping component or a continuous, composite wrapping components, each wrapping portion 110, nonetheless, includes a fastener 150 in the same manner as previously discussed with respect to the other embodiments or further discussed hereinafter.

The fasteners 150, as shown throughout the figures, may be positioned (1) in the vicinity 125 of the trailing end 126, (2) remote from the leading edge 124 and the trailing edge 126 of each wrapping portion 110; or (3) in the vicinity of the leading edge 124. The fastener base 152 of each fastener 150 is secured by any suitable means, such as, for example, an adhesive, to the single continuous component 120' of the wrapping material 100, as shown in FIGS. 12 and 13D, or to either one or both of the continuous component 120 and the discontinuous component 130, or sub-components 130', as shown in FIGS. 2A-11 and 13A-D. Each fastener 150 may also be positionally oriented on the wrapping material 100 within an angular range from substantially parallel to either of the length direction (arrow A) or width direction (arrow B) of the wrapping material 100 to substantially transverse to the length direction (arrow A) or width direction (arrow B) of the wrapping material 100. With these arrangements, a wide variety of continuous and discontinuous areas of connection between each fastener 150 and the respective underlying or overlying segments 112 of the wrapping material 100 may be realized that would allow for fine tuning of the connection force and connection area to specific uses, items to be wrapped, and environmental conditions, to name a few. As the item I is being wrapped the plurality of engaging elements 154 will mesh, engage, or interact with the fiber elements of any underlying or overlying segment 112 of the wrapping material 100, thereby locking the tail end 126 in place and securing the wrapping portion 110 around the circumference of the wrapped item I. It should also be noted that when sub-panels 130' are utilized, a collection of fasteners 150 may also be disposed and positioned thereon in the same manner discussed above.

Figure 13A:
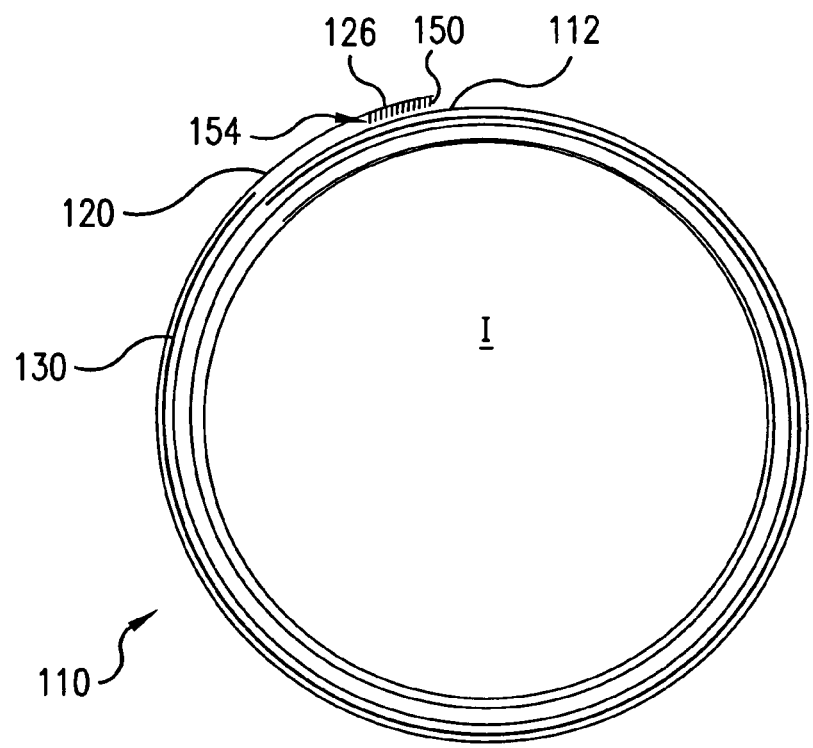
FIGS. 13A-C are cross-sectional views of the wrapping material loosely wrapped around the circumference of an item according to various embodiments of the present invention.
Figure 13B:
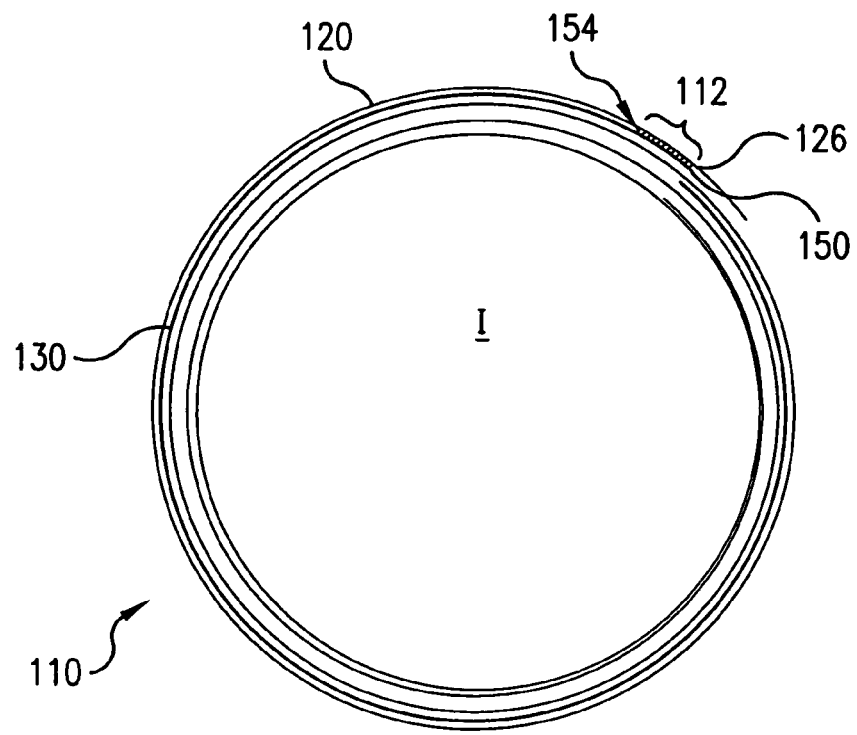
Figure 13C:
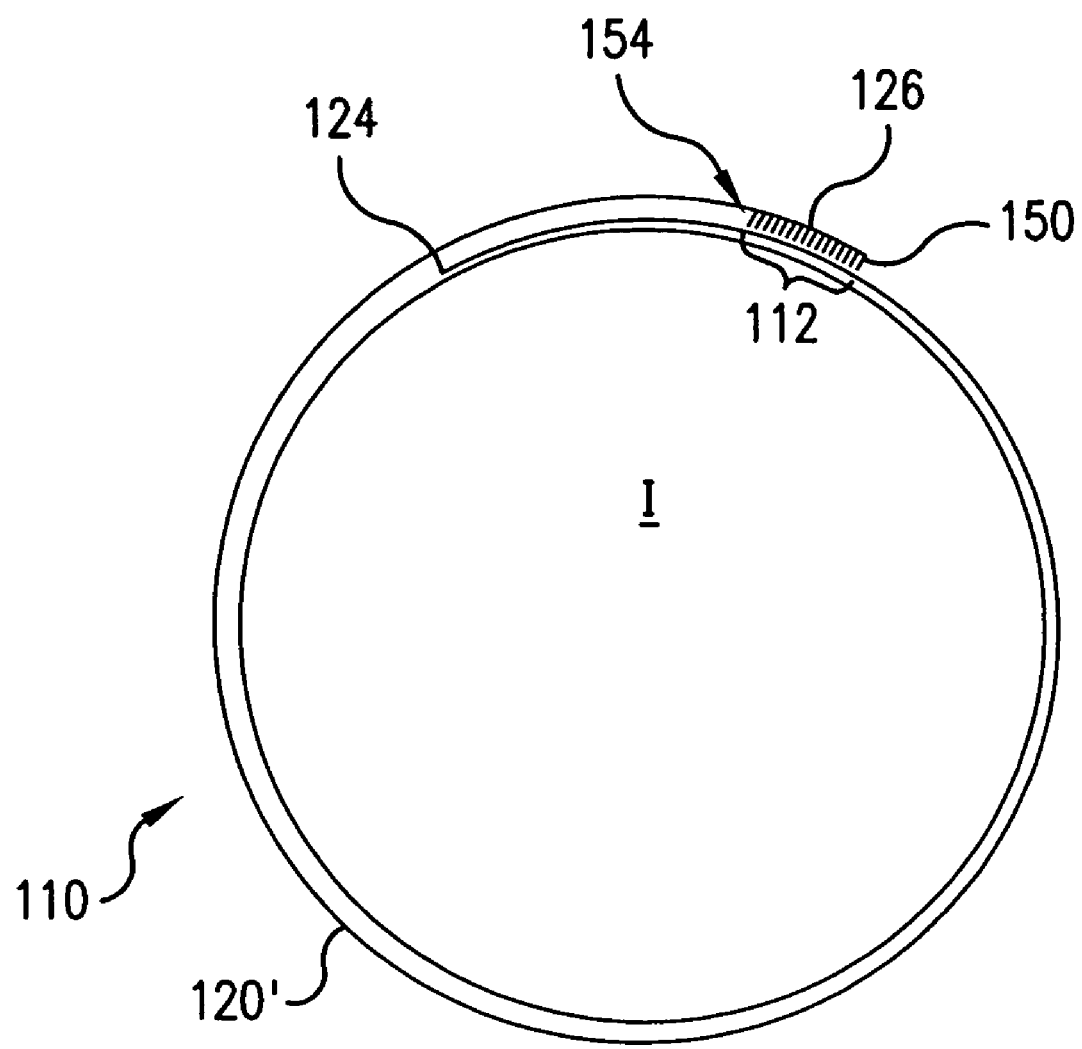
Figure 13D:
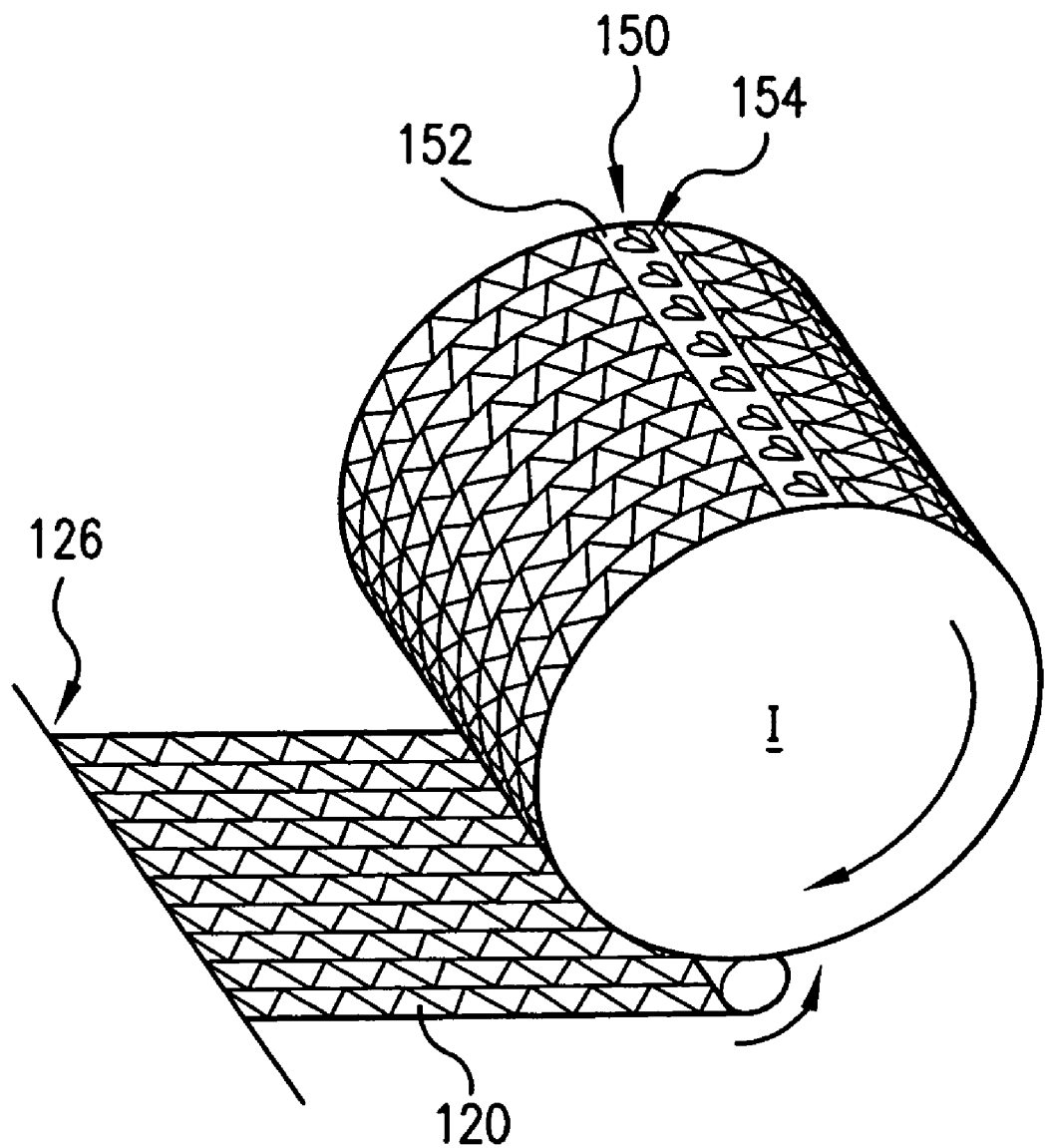
FIG. 13D is a perspective view of the wrapping material during a wrapping cycle according to an embodiment of the present invention.

FIGS. 13A-C illustrate cross-sectional ans perspective views of a wrapped item I in accordance with various embodiments of the invention, which, for the sake of understanding, show wrapping portions 110 loosely wrapped around an item I. FIG. 13D, on the other hand, illustrates a perspective view of a wrapped item I near the end of a wrapping cycle. As shown in FIGS. 13A and 13B, when the breathable material, or discontinuous components, 130 is, or are, mounted on a face of the netting material, or continuous component, 120 is placed against the item I, what is essentially a first layer of netting will contact the item I at a first level. This contacting netting corresponds to a first wrapping layer and may comprise slightly more or less than one complete circumference of a wrapping, as desired, around the item I. Above this layer is the discontinuous breathable material component 130, 130' forming a second wrapping layer, and above the second layer a third layer of netting material 120 is formed from a continuation of the same continuous netting material component 120 that formed the first wrapping layer. Each fastener 150, which has, for example, been attached to either the continuous component 120 or discontinuous component 130, 130', will be pressed into contact, or otherwise interact, with an underlying or overlying segment 112, as shown in FIGS. 13A and 13B, of the continuous netting material components 120. It is this contact that allows the plurality of engaging elements 154 of each fastener 150 to engage, catch, grab, lock, hold, or otherwise fasten the fiber elements of the underlying or overlying segment 112 of the wrapping material 100. The interaction between the plurality of small engaging elements with the fiber elements of the respective underlying or overlying segments 112 allows the fasteners 150 to engage, catch, grab, lock, hold, or otherwise fasten the wrapping material 100, as a whole, tightly around the wrapped item I with the tail end 126 secured as previously discussed.

With specific regard to the embodiment shown in FIG. 13D, the wrapping material 100 specifically utilizes the fastener 150 shown in FIG. 1D, the finger-like engaging elements 154 are sufficiently resilient so as to raise above the engaging element base 152 to engage, catch, grab, lock, hold, or otherwise fasten to the fibers of the wrapping material component 110 in place around the item 1. As discussed above, each of finger-like engaging element bodies 154b, as shown in FIG. 1D, are angled away from the fastener base 152 an angle θ in a preferred range of about 15 degrees to about 45 degrees.

As shown in FIG. 12, the wrapping portion 110 is comprised of the single breathable material 120 that may comprise slightly more than one complete circumference of a wrapping, as desired, around the item I to allow for fastener interaction with an underlying or overlaying segment 112. Each fastener 150, which has, for example, been attached thereto, preferably in either (1) in the vicinity 125 of the trailing end 126, as shown in FIGS. 12 and 13D, or (2) remote from the leading edge 124 and the trailing edge 126, not shown, of each wrapping portion 120', will be pressed into contact with an underlying or overlying segment 112 of the single continuous breathable component 120'. Just as in the composite wrapping material 100 of other embodiments, such contact allows the plurality of engaging elements 154 of each fastener 150 to engage the fiber elements of the underlying or overlying segment 112 of the wrapping material 100. The interaction between the plurality of engaging elements with the fiber elements of the respective underlying or overlying segments 112, allows the fasteners 150 to engage, lock, hold, or otherwise fasten the wrapping material 100, as a whole, tightly around the wrapped item I with the tail end 126 secured as previously discussed.

It should be emphasized that the wrapping material of the present invention is not limited only to the specific material or specific dimensions, and has applications for preparation of all wrapping material, taking into consideration the desirable qualities of each material and the purposes for which the items are being wrapped.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A bale wrapping material for wrapping a bale of agricultural product having a circumference, comprising:

a plurality of bale wrapping portions, each having a wrapping portion length greater than the circumference of the bale of agricultural product and a wrapping portion width transverse to said wrapping portion length, said plurality of wrapping portions forming a continuous roll of wrapping material for wrapping a bale of agricultural product; and at least one fastener secured to an area of each of said plurality of bale wrapping portions such that said continuous roll of wrapping material includes a plurality of fasteners serially disposed thereon and spaced from one another so that each of said plurality of bale wrapping portions includes said at least one fastener within said area, each of said plurality of fasteners include a plurality of engaging elements for engaging a plurality of fiber elements of an underlying or overlying segment of a respective wrapping portion during a wrapping cycle so as to secure, a tail end of said respective wrapping portion to said underlying or overlying segment at the end of a wrapping cycle;

wherein each wrapping portion includes a continuous wrapping component and a discontinuous wrapping component, said discontinuous wrapping component comprising a breathable material, said at least one fastener being attached to either said continuous wrapping component or said discontinuous wrapping component, and said underlying or overlying segment being a portion of the other of said continuous wrapping component and said discontinuous wrapping component.

2. The bale wrapping material according to claim 1, wherein each of said plurality of engaging elements include an engaging element body having an engaging element base and an engaging element free end, said engaging element base being attached to a fastener base and said engaging element free end being adapted to engage said fiber elements of said underlying or overlying segment.

3. The bale wrapping material according to claim 2, wherein each engaging element body has a length in a range of about 0.1 mm to about 20 mm.

4. The bale wrapping material according to claim 2, wherein each engaging element body extends from said fastener base at an angle in a range of about 15 degrees to about 90 degrees relative to the fastener base.

5. The bale wrapping material according claim 1, wherein said continuous wrapping component is a netting material, and said discontinuous wrapping component is at least one breathable polymeric panel.

6. The bale wrapping material according to claim 1, wherein each of said plurality of bale wrapping portions includes a continuous wrapping component connected end-to-end with other adjacent bale wrapping portions forming said continuous roll of wrapping material.

7. The bale wrapping material according to claim 1, wherein said continuous wrapping component and said discontinuous wrapping component each have a length that is at least substantially equal to the circumference of the bale to be wrapped.

8. The bale wrapping material of claim 1, wherein each of said bale wrapping portions, when wrapped around the circumference of an bale, comprises:
a first level of said wrapping material comprising at least one layer of a said continuous wrapping component wrapped around the circumference of the bale; and
a second level of said wrapping material comprising at least one layer of a continuous wrapping component overlapping said first level and wrapped around the circumference of the bale.

9. The bale wrapping material according to claim 8, wherein said second level of said wrapping material includes an additional layer of said discontinuous wrapping component overlapping a segment of said at least one layer of said discontinuous wrapping component.

10. The bale wrapping material according to claim 9, wherein said continuous portion comprises a netting.

11. The bale wrapping material according to claim 8, further comprising a third level of said wrapping material comprising at least one layer of said continuous wrapping portion overlapping said second level and wrapped around the circumference of the bale.

12. The bale wrapping material according to claim 11, wherein said second level of said wrapping material includes an additional layer of said discontinuous component overlapping a segment of said at least one layer of said discontinuous wrapping component.

13. The bale wrapping material according to claim 1, wherein the bale is formed from agricultural product.

14. The bale wrapping material according to claim 1, wherein said breathable material is adapted to permit moisture to pass.

15. The bale wrapping material according to claim 1, wherein said discontinuous wrapping component is a first discontinuous wrapping component, each wrapping portion further comprising a second discontinuous wrapping component.

16. The bale wrapping material according to claim 15, wherein the first discontinuous wrapping component has a length approximately equal to the circumference of the bale being wrapped.

17. A bale wrapping material for wrapping a bale of agricultural product having a circumference, comprising:
a plurality of bale wrapping portions, each having a wrapping portion length greater than the circumference of the bale of agricultural product and a wrapping portion width transverse to said wrapping portion length, said plurality of bale wrapping portions forming a continuous roll of wrapping material for wrapping a bale of agricultural product; and
at least one fastener secured to an area of each of said plurality of bale wrapping portions such that said continuous roll of wrapping material includes a plurality of fasteners serially disposed thereon and spaced from one another so that each of said plurality of bale wrapping portions includes said at least one fastener within said area, each of said plurality of fasteners include a plurality of engaging elements for engaging a plurality of fiber elements of an underlying or overlying segment of a respective wrapping portion during a wrapping cycle so as to secure a tail end of said respective wrapping portion to said underlying segment at the end of a wrapping cycle;
wherein each said wrapping portion includes a continuous wrapping component and at least one panel of a breathable material, and each of said at least one breathable panel comprises a plurality of sub-panels disposed on each said wrapping portion in such a manner so as to co-act with one another to form said at least one breathable panel when each said wrapping portion is wrapped around the circumference of an bale.

* * * * *

UNITED STATES PATENT AND TRADEMARK OFFICE
CERTIFICATE OF CORRECTION

PATENT NO. : 7,636,987 B2  Page 1 of 1
APPLICATION NO. : 11/288113
DATED : December 29, 2009
INVENTOR(S) : Derscheid et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Twenty-first Day of December, 2010

David J. Kappos
*Director of the United States Patent and Trademark Office*